United States Patent
Patil

(10) Patent No.: US 10,575,058 B2
(45) Date of Patent: Feb. 25, 2020

(54) METHOD AND A SYSTEM FOR ENABLING AN USER TO CONSUME A VIDEO OR AUDIO CONTENT UNDERSTANDABLE WITH RESPECT TO A PREFERRED LANGUAGE

(71) Applicant: Mrityunjay Patil, Athani (IN)

(72) Inventor: Mrityunjay Patil, Athani (IN)

(73) Assignee: Mrityunjay Patil, Athani ( * ) Notice: Subject to any disclaimer, the term of this patent is extended or adjusted under 35 U.S.C. 154(b) by 0 days.

(21) Appl. No.: 15/459,179

(22) Filed: Mar. 15, 2017

(65) Prior Publication Data

US 2017/0272820 A1 Sep. 21, 2017

Related U.S. Application Data

(60) Provisional application No. 62/308,882, filed on Mar. 16, 2016, provisional application No. 62/308,875, filed on Mar. 16, 2016, provisional application No. 62/308,877, filed on Mar. 16, 2016.

(51) Int. Cl.
| | |
|---|---|
| *H04N 21/47* | (2011.01) |
| *H04N 21/475* | (2011.01) |
| *H04N 21/258* | (2011.01) |
| *H04N 21/488* | (2011.01) |
| *G06F 17/28* | (2006.01) |
| *H04N 21/485* | (2011.01) |
| *H04N 21/81* | (2011.01) |

(52) U.S. Cl.
CPC ......... *H04N 21/4758* (2013.01); *G06F 17/28* (2013.01); *H04N 21/25841* (2013.01); *H04N 21/4852* (2013.01); *H04N 21/4884* (2013.01); *H04N 21/8106* (2013.01)

(58) Field of Classification Search
None
See application file for complete search history.

(56) References Cited

U.S. PATENT DOCUMENTS

| | | | | |
|---|---|---|---|---|
| 6,192,332 | B1* | 2/2001 | Golding | G06F 15/025 704/10 |
| 8,949,125 | B1* | 2/2015 | Chechik | G10L 13/02 704/243 |
| 9,323,854 | B2* | 4/2016 | Massuh | G06F 17/289 |
| 2003/0196204 | A1* | 10/2003 | Thiagarajan | H04N 7/17318 725/61 |
| 2003/0208754 | A1* | 11/2003 | Sridhar | G06Q 30/02 725/34 |
| 2004/0138924 | A1* | 7/2004 | Pristine | G06Q 10/04 705/2 |

(Continued)

*Primary Examiner* — Neeraj Sharma

(57) ABSTRACT

A method for enabling an user to consume a video or audio content understandable with respect to a preferred language. The method includes receiving a content selection input from an user for selecting a video or audio content for viewing from a set of contents, wherein the content is available in one or more languages, receiving a location related information of the user, identifying the preferred language for providing the content, fetching the content from the server based on the preferred language, if the content is not available in the preferred language, fetching a text content along with the video or audio content in relation to the preferred language, rendering the video or audio content alone or in synchronization with the text content.

15 Claims, 4 Drawing Sheets

(56) References Cited

U.S. PATENT DOCUMENTS

| | | | |
|---|---|---|---|
| 2005/0203727 A1* | 9/2005 | Heiner | G06F 17/289 704/2 |
| 2006/0200766 A1* | 9/2006 | Lakritz | G06F 15/00 715/234 |
| 2007/0244688 A1* | 10/2007 | Bangalore | G06F 17/289 704/3 |
| 2010/0138209 A1* | 6/2010 | Harrenstien | G06F 17/289 704/2 |
| 2010/0257569 A1* | 10/2010 | O'Hanlon | G11B 27/10 725/110 |
| 2012/0016655 A1* | 1/2012 | Travieso | G06F 16/9537 704/2 |
| 2014/0099082 A1* | 4/2014 | Miller | H04N 5/93 386/285 |
| 2015/0281299 A1* | 10/2015 | Moustafa | H04L 65/60 709/219 |

* cited by examiner

Select Video:　　　　[ Video 1 ]　　　[ Video 2 ]　　　→ 201

Language Selection　　　　　　[ Language 1 ▼ ]　　→ 202

Video and Subtitles　　　　　　[ ▶ ]　　→ 203

Quiz Questions:

Question1. Identify the actor shown in the video?

A.
B.
C.

Question2. Identify the actress shown in the video?

A.
B.
C.
　　　　　　　　　　　　　　　　　→ 205
[ Save ]　　　[ Submit ]

Winners Selection:　　→ 206

FIG. 2

METHOD AND A SYSTEM FOR ENABLING AN USER TO CONSUME A VIDEO OR AUDIO CONTENT UNDERSTANDABLE WITH RESPECT TO A PREFERRED LANGUAGE

CROSS-REFERENCE TO RELATED APPLICATION

This application claims the benefit of U.S. Provisional Application No. 62/308,875, filed Mar. 16, 2016, U.S. Provisional Application No. 62/308,877, filed Mar. 16, 2016, and U.S. Provisional Application No. 62/308,882, filed Mar. 16, 2016.

FIELD OF INVENTION

The invention relates to enabling a user to consume video or audio related contents by selecting the content from multiple available contents. More specifically, the invention relates to enabling a consumer to consume audio or video related content understandable with respect to a preferred language.

BACKGROUND OF THE INVENTION

Contents are produced around the world in a primary language, and dubbed into few languages. However, they are not able to reach to the wider audiences, who may be interested in viewing these contents, however because of language barrier cannot consume those contents. If the contents are provided in a language which a viewer knows, there is a high probability that a viewer may view content.

At the same time, it is not possible to dub a video in all the languages, which run in thousands and million. Many times, producer provides sub-titles in language of the viewer, if the language of the produced video is not known to the user. However, to provide the sub-titles too into so many languages is not humanly possible too.

Many times, viewers know more than one language, and if the content is provided in a language which a viewer knows, however have lower proficiency of understanding, still the viewer may be able to consume the video.

There is a need for an optimal mechanism to provide the contents to a viewer optimally, so that the contents consumption increases to a wider audience.

OBJECT OF THE INVENTION

The object of the invention is to provide a mechanism for enabling a user to consume a video or audio content understandable with respect to a preferred language.

SUMMARY OF THE INVENTION

The object of the invention is achieved by a method of claim 1.

According to one embodiment of the method, the method includes
  receiving a content selection input from an user for selecting a video or audio content for viewing from a set of contents, wherein the content is available in one or more languages,
  receiving a location related information of the user,
  identifying the preferred language for providing the content,
  fetching the content from the server based on the preferred language,
  if the content is not available in the preferred language, fetching a text content along with the video or audio content in relation to the preferred language,
  rendering the video or audio content alone or in synchronization with the text content.

According to another embodiment of the method, wherein identifying the preferred language for providing the content based on the location related information or the selection input, or combination thereof.

According to yet another embodiment of the method, wherein the preferred language is provided as an input by the user, and if the content is not available in the preferred language then processing the location related information and language availability information for the audio or video content in which the contents are available, fetching language influence index for each of the language, comparing language influence index, and fetching the audio or video content in the language with highest influence index.

According to one embodiment of the method, the method includes identifying if the text content is available as translation in the preferred language, and fetching the text content as translation in the preferred language from the server.

According to another embodiment of the method, wherein if the text content is not available as the translation in the preferred language, identifying if the text content is available as iteration in script of the preferred language, and fetching the text content as iteration in the script of the preferred language from the server.

According to yet another embodiment of the method, wherein if the text content is not available as iteration in the script of the preferred language, then processing the location related information and language availability information for the text content as translation or iteration script of the audio or video content, fetching language influence index for each of the language, comparing language influence index, and fetching the text content as translation or iteration scrip in the language with highest influence index.

According to one embodiment of the method, the method includes:
  Identifying if a set of questionnaire based on the audio or video content is available in preferred language, than fetching the questionnaire in the preferred language,
  If the questionnaire is not available in the preferred language, than processing the location related information and language availability information for the questionnaire as translation or iteration script in the preferred language, fetching language influence index for each of the language, comparing language influence index, and fetching the questionnaire as translation or iteration scrip in the language with highest influence index,
  rendering the questionnaire.

According to another embodiment of the method, the method includes:
  Identifying if a set of questionnaire based on the audio or video content is available in preferred language, than fetching the questionnaire in the preferred language,
  If the questionnaire is not available in the preferred language, than translating the questionnaire in the preferred language,
  fetching the translated questionnaire
  rendering the questionnaire.

The object of the invention is also achieved by a method of claim 9.

According to one embodiment of the method, the method includes:
- receiving a content selection input from an user for selecting the music video for viewing from a set of contents, wherein the music video is available in one languages,
- receiving a location related information of the user,
- identifying the preferred language for providing the content,
- if the preferred language is not the language of the music video, fetching a text content along with the video or audio content based on the preferred language,
- fetching the content from the server in relation to the preferred language,
- rendering the video or audio content alone or in synchronization with the text content.

According to another embodiment of the method, the method includes identifying if the text content is available as iteration in script of the preferred language, and fetching the text content as iteration in script of the preferred language from the server.

According to yet another embodiment of the method, wherein if the text content is not available as iteration in script of the preferred language, identifying if the text content is available as translation in the preferred language, and fetching the text content as translation in the preferred language from the server.

According to one embodiment of the method, wherein if the text content is not available as iteration in the script of the preferred language, then processing the location related information and language availability information for the text content as translation or iteration script of the music video, fetching language influence index for each of the language, comparing language influence index, and fetching the text content as translation or iteration script in the language with highest influence index.

According to another embodiment of the method, the method includes:
- Identifying if a set of questionnaire based on the music video is available in preferred language then fetching the questionnaire in the preferred language,
- If the questionnaire is not available in the preferred language, than processing the location related information and language availability information for the questionnaire as translation or iteration script in the preferred language, fetching language influence index for each of the language, comparing language influence index, and fetching the questionnaire as translation or iteration scrip in the language with highest influence index,
- rendering the questionnaire.

According yet another embodiment of the method, the method includes:
- Identifying if a set of questionnaire based on the audio or video content is available in preferred language, than fetching the questionnaire in the preferred language,
- If the questionnaire is not available in the preferred language, than translating the questionnaire in the preferred language,
- fetching the translated questionnaire
- rendering the questionnaire.

The object of the invention is also achieved by a system of claim 15.

According to one embodiment of the system, the system includes:
- One or memory devices storing at least one of contents, language availability of contents, language influential index of each of the language with respect to a geographic location, or a location information of a user,
- Input devices adapted to receive a content selection input from the user for selecting a video or audio content for viewing from a set of contents, wherein the content is available in one or more languages,
- One or more processors adapted to:
  - Provide one or more selection of contents,
  - receiving the content selection input from the input device,
  - receiving a location related information of the user,
  - identifying the preferred language for providing the content,
  - fetching the content from the server based on the preferred language,
  - if the content is not available in the preferred language, fetching a text content along with the video or audio content in relation to the preferred language,
- a display device adapted to show the selection and further receiving the audio or video content alone or along with the text content and to render the audio or video content alone or along with the text content in synchronization with each other.

According to another embodiment of the system, wherein identifying the preferred language for providing the content based on the location related information or the selection input, or combination thereof.

According to yet another embodiment of the system, wherein the memory stores a location related information, a language availability information regarding availability of the audio or video content in a language, and a language influence index related to influence of a language to a geographic location, and the preferred language is provided as an input by the user via the input device, and if the content is not available in the preferred language than processor is adapted to receive and process the location related information and the language availability information, to fetch language influence index for each of the language, to compare language influence index, and to fetch the audio or video content in the language with highest influence index.

According to one embodiment of the system, wherein the processor is adapted to identifying if the text content is available as translation in the preferred language or script of the preferred language, and to fetch the text content as translation in the preferred language or script in the preferred language from the server.

According to another embodiment of the system, wherein the memory stores a language availability information for the text content as translation or iteration script of the audio or video content, and if the text content is not available as iteration in the script of the preferred language or translation in the preferred language, than the processor is adapted to receive and process the location related information and the language availability information for the text content as translation or iteration script of the audio or video content, to fetch the language influence index for each of the language, to compare language influence index, and to fetch the text content as translation or iteration script in the language with highest influence index.

According to yet another embodiment of the system, wherein the memory stores a set of questionnaire based on audio or video content, the processor is adapted to identifying if the set of questionnaire is available in preferred language, then to fetch the questionnaire in the preferred language based on availability, and if the questionnaire is not available in the preferred language, than to receive the location related information and a language availability information for the questionnaire as translation or iteration script in the preferred language, to process the location related information and the language availability information, and to fetch a language influence index for each of the language, to compare language influence index, and to fetch the questionnaire as translation or iteration script in the language with highest influence index, and the display is adapted to receive the questionnaire from the processor and to render the questionnaire.

According to one embodiment of the system, wherein the memory stores a set of questionnaire based on audio or video content, the processor is adapted to identifying if the set of questionnaire is available in preferred language, then to fetch the questionnaire in the preferred language based on availability, and if the questionnaire is not available in the preferred language, than to translate the questionnaire in the preferred language, and to fetch the translated questionnaire, and the display is adapted to receive the questionnaire from the processor and to render the questionnaire.

BRIEF DESCRIPTION OF THE DRAWINGS

FIG. 2 illustrates an exemplary implementation of an embodiment of the invention, where contents are video contents.

DETAILED DESCRIPTION OF THE INVENTION

The best and other modes for carrying out the present invention are presented in terms of the embodiments, herein depicted in FIGS. 1 to 4. The embodiments are described herein for illustrative purposes and are subject to many variations. It is understood that various omissions and substitutions of equivalents are contemplated as circumstances may suggest or render expedient, but are intended to cover the application or implementation without departing from the spirit or scope of the present invention. Further, it is to be understood that the phraseology and terminology employed herein are for the purpose of the description and should not be regarded as limiting. Any heading utilized within this description is for convenience only and has no legal or limiting effect.

The terms "a" and "an" herein do not denote a limitation of quantity, but rather denote the presence of at least one of the referenced item.

Figure 1:
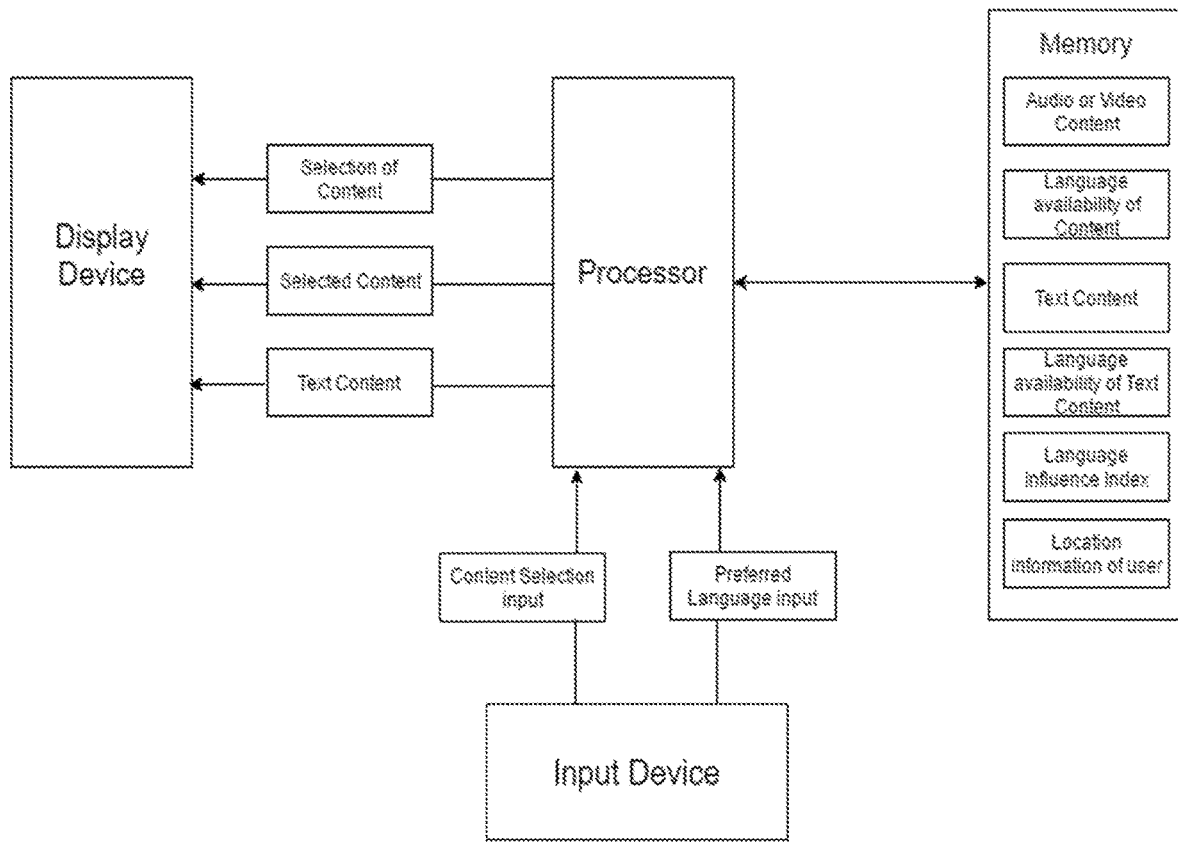
FIG. 1 illustrates a system for enabling an user to consume a video or audio content understandable with respect to a preferred language.

FIG. 1 illustrates a system for enabling a user to consume a video or audio content understandable with respect to a preferred language. The system includes memory device/s, input device/s, one or more processors, and a display device. The memory devices stores at least one of contents, language availability of contents, language influential index of each of the language with respect to a geographic location, or a location information of a user. Input devices receives a content selection input from the user for selecting a video or audio content for viewing from a set of contents, wherein the content is available in one or more languages. The processors provide one or more selection of contents, receives the content selection input from the input device, receives location related information of the user, identifies the preferred language for providing the content, and fetches the content from the server based on the preferred language. If the content is not available in the preferred language, than the processor, fetches a text content along with the video or audio content in relation to the preferred language. The display device adapted to show the selection and further receiving the audio or video content alone or along with the text content and to render the audio or video content alone or along with the text content in synchronization with each other.

In one embodiment of the invention, wherein the processor provides a default language without any user input, by identifying the preferred language for providing the content based on the location related information or the selection input, or combination thereof.

The memory also stores a location related information, a language availability information regarding availability of the audio or video content in a language, and a language influence index related to influence of a language to a geographic location. The preferred language in which the content has to be viewed is provided as an input by the user via the input device. If the content is not available in the preferred language than processor receives and processes the location related information and the language availability information, fetches language influence index for each of the language, compares language influence index, and fetches the audio or video content in the language with highest influence index.

In one embodiment, in case when the content is not available in the preferred language, the processor identifies if the text content is available as translation in the preferred language or script of the preferred language, and fetches the text content as translation in the preferred language or script in the preferred language from the server.

The memory also stores a language availability information for the text content as translation or iteration script of the audio or video content. In one embodiment, if the text content is not available as iteration in the script of the preferred language or translation in the preferred language, than the processor receives and process the location related information and the language availability information for the text content as translation or iteration script of the audio or video content, fetches the language influence index for each of the language, compares language influence index, and fetches the text content as translation or iteration script in the language with highest influence index.

The memory stores a set of questionnaire based on audio or video content. The processor identifies if the set of questionnaire is available in preferred language, then fetches the questionnaire in the preferred language based on availability, and if the questionnaire is not available in the preferred language, than receives the location related information and a language availability information for the questionnaire as translation or iteration script in the preferred language, processes the location related information and the language availability information, and fetches a language influence index for each of the language, compares language influence index, and fetches the questionnaire as translation or iteration script in the language with highest influence index, and the display receives the questionnaire from the processor and renders the questionnaire.

In one embodiment, the processor identifies if the set of questionnaire is available in preferred language, then fetches the questionnaire in the preferred language based on availability, and if the questionnaire is not available in the preferred language, than translates the questionnaire in the preferred language, and fetches the translated questionnaire, and the display is receives the questionnaire from the processor and renders the questionnaire.

Various elements of the system are further explained below.

The location information of the user is geographical location of the input device/s or the display device/s of the user or a location entered or identified by the user himself. The user can login from multiple locations, in such cases, location information of the user can be considered as a combination of the location form data filled by the user and geographical location input/display device at one or more instances.

Language influence index defines influential language in particular geography other than native language. Language influence index takes into account languages influential in a geographical region and for all such languages index from highest influence to lowest influence are assigned. The language influence index is updated to represented influence of a particular language in a particular region. It is to be noted that multiple languages are spoken in a region. For example diverse country like India has many languages and cultures. Even a language can have many dialects like in China.

For video in one particular language the content may not be available in users preferred language. In such cases we need to consider the language which is nearest to language of the user and content availability in the language of influence. Hence language influence index plays important role. In scenario, when the audience are linguistically too diverse, like India, where Hindi is majorly understood language, and Japan, where Japanese is most understood language, English could be taken as a common understandable language between both the countries, and shall have substantial influence index for a user of Japan with respect to Hindi, and shall have substantial influence index for a user of India with respect to Japanese. Thus whenever conversion required between Hindi (One Country Language) and Japanese (Another country language) and vice versa, English takes the highest preference in the language influence index when the content is not available in latter language.

Similarly when a conversion is required between two different domicile/state languages of a country, then the language influence index is used to derive the best possible influential language alternative to language under consideration. Consider the scenario of Kannada (domicile/state language) content to Telugu (domicile/state language) user for country India, then English and Hindi languages comes into consideration as influential languages for the geographical location. If the content is not available in user preferred language, then content and text are fetched in relation to preferred language and influential language.

According to one embodiment of the invention, the influential index is derived by categorizing languages in three categories.

World Language—Languages which are used in more than one country. For example, English, Spanish, French etc.

Country Language—National or most used languages of different countries. For example, Hindi, Chinese, Japanese, Korean, etc.

Domicile/State Languages—Languages which are used within a country. For example, country India has many languages which are used in different parts of the country.

If preferred language is a first country language for a user having geographic location of a first country, and the contents are not available in the first country language, then a world language which shall be influential in the first country location, comes into consideration as influential language.

If preferred language is a domicile/state language of first country, then the first country language and the world language influential in state/domicile location of the first country, comes into consideration as influential language.

Language influence index is used to fetch the video or audio content, text content (subtitles or lyrics) which are further rendered on display device. Rendered video or audio content and text content differs for different types of content. Music video is available in always one language. Movie video can be available in more than one language. Video in general is available in one or more languages.

With respect to current invention, we need to have scripts, dubbing and translation in alternative languages.

For music video, alternate scripts will be available in few languages depending on the primary intended audience for the music video.

Broadly, it is not possible to define the alternative scripts for each individual language. English is the worldwide language, so English script is used most. Also one important thing to consider is English is not spoken in all the countries. Most of Chinese people do not know English, so in such cases, we may need to adopt mandarin (Chinese) script. Also in Northern parts of India, Hindi is more popular language, Hindi script will be adopted. If the intended audience knows English, then English script will be adopted, otherwise language of the country of the user will be adopted for subtitles.

Script language always tends towards English then to country/national language of the user (closest language of the user).

Similarly for movie video and video in general, influential language with respect to particular geographical location is taken into consideration.

The content is rendered on the display device of the user based on the preferred language of the user.

For a video content, it is considered that video is available in one language. For videos, exception to music and movie videos, translation text contents takes higher priority over iteration script of the video for the same language. Whenever the preferred language of the user is different than video production language, the text content (subtitles) in preferred language takes higher priority. The text content along with video content is rendered to the user. Language influence index is used to determine the influential language in the geographical location of the user. The language influence index comes into consideration, when both conditions, the user preferred language is different than video produced language and content is not available in the preferred language of the user.

The further example explains how the preference is made. For particular combination of Video Language (VL) and User Selected Language (USL), certain algorithm is used. These algorithms define how video and subtitles play/appear. There are various options for each of the formats. Priority option for the video and subtitles play/appear is defined for each of the algorithm. Priority follows the path option a, option b, option c to option n. Also there is most used option. Most used option indicates which of the option has possibility of appearing most of the times. This most used option tends towards English, since English is the worldwide language.

Basically priority is defined in the following way.

Provide the subtitles as translation in User Selected Language.

Provide the subtitles as translation in World/Country Language of the user (Influential language in the geographical location of the user).

Provide the subtitles as script in User selected language corresponding to the video.

Provide the subtitles as script in World/Country Language corresponding to the user (Influential language in the geographical location of the user).

If all the above options are not applicable then provide the subtitles in Video language.

When no subtitles are available then provide the video with no subtitles.

In most cases, second condition is met and user is provided with subtitles as translation in English (world language)/country language.

Music video is available in one language, in the music produced language. For music videos, script takes higher priority over translation for the same language. Whenever the preferred language of the user is different than video production language, the text content (lyrics) in preferred language takes higher priority. The text content along with video content is rendered to the user. Language influence index is used to determine the influential language in the geographical location of the user. The language influence index comes into consideration, when both conditions, the user preferred language is different than video produced language and content is not available in the preferred language of the user. Consider the below example.

Music video production language—MVL
User selected language—USL
World Language—WL—Influential Language
Country Language—CL—Influential Language Then Music contest will be available on the below-said rules.

Music Video and Subtitles—Options and Priorities
 a. Music video play/available in MVL, with Lyrics in USL as subtitles
 b. Music video play/available in MVL, with Lyrics in WL/CL as subtitles
 c. Music video play/available in MVL, with Meaning in USL as subtitles
 d. Music video play/available in MVL, with Meaning in WL/CL as subtitles
 e. Music video play/available in MVL, with Lyrics in MVL as subtitles
 f. Music video play/available in MVL, with No Subtitles Questionnaires—USL For a video in one country language it is not always possible to have the subtitles in user's preferred language. First priority is not met always. So, second priority is the most used option.

Movie video is available in one or more languages, in the movie video produced language and voice dubbed languages. For movie videos, dubbing takes higher priority over translation/script for the same language. Whenever the preferred language of the user is different than video production language, the dubbing content in preferred language takes higher priority and then translation takes priority over script for the same language including dubbed video language. The text content along with video content is rendered to the user. Language influence index is used to determine the influential language in the geographical location of the user. The language influence index comes into consideration, when both conditions, the user preferred language is different than video produced language and content is not available in the preferred language of the user.

Consider the below example.
Movie video production language—MTL
User selected language—USL
World Language—WL—Influential Language
Country Language—CL—Influential Language Then contest will be available on below-said rules.
Movie video and Subtitles—Options and Priorities
1. USL Dubbed Version
 a. Movie video in USL dubbed version, with USL subtitles
 b. Movie video in USL dubbed version, with English/WL script of USL Subtitles
2. Wl/Cl Dubbed Version
 c. Movie video in WL/CL dubbed version, with USL translation as subtitles
 d. Movie video in WL/CL dubbed version, with USL script of English subtitles
 e. Movie video in WL/CL dubbed version, with English subtitles
3. MTL Version
 f. Movie video available in MTL, with Translation in USL as subtitles.
 g. Movie video available in MTL, with Translation in WL as subtitles.
 h. Movie video available in MTL, with USL script of MTL Subtitles.
 i. Movie video available in MTL, with WL script of MTL Subtitles.
 j. Movie video available in MTL, with Subtitles in MTL.
 k. Movie video available in MTL, with No Subtitles.
4. Questions—USL Assumption is made that subtitles is available in USL, WL and MTL. If subtitles not available in USL, then options a, c are not applicable. If subtitles not available in WL, then options b, d not applicable. If subtitles not available in MTL, then option e is not applicable.

Subtitles (translation or script as iterations) are rendered depending on language in which video is produced and user selected language. Based on these, particular algorithm is applied and subtitles language is determined. Subtitles language is a factor to be considered.

For some languages, it is difficult to use them and difficult to write, post them either as subtitles or questions. In such cases the world language like English script or script of the language which is second best to the user is taken. Subtitles script and questions script always tends towards English.

In one embodiment of the invention, for most cases English script is adopted. Adoption of different script also depends on country of the user and language which is stronger in that particular region.

Subtitles as translation and subtitles as script of iteration are two different things. For example, consider India where both English and Hindi are stronger. For Indian state languages subtitles, then English script or Hindi script can be adopted. Let's explain using following:
VL—Video Language
USL—User Selected Language
WL—World Language
CL—Country Language Consider the scenario, where subtitles are translation of VL:Video in VL, subtitles as Translation in USL, then subtitles script options are
 a. Subtitles Script can be in USL
 b. Subtitles Script can be in English/WL or CL of the user Consider, Subtitles Language=x (x holds the value of subtitles language)
Then subtitles can be: (a) x
(b) English/WL script of x
(c) CL script of x This explains subtitles script can be different from subtitles languages. These scripts if not in USL, tend towards international (English) and national languages i.e. will be in English (International language), national language or second best language for the user.

EXAMPLE 1

Video in English, subtitles as Translation in Hindi, then subtitles script options are
Subtitles Script can be in Hindi
Subtitles Script can be in English/WL script of Hindi

EXAMPLE 2

Video in English, subtitles results in Translation in Kannada, then subtitles script options are
Subtitles Script can be in Kannada
Subtitles Script can be in English/WL script of Kannada
Subtitles Script can be in Hindi/CL script of Kannada
Here English is international language and Hindi is the country language of India.

Another scenario: USL script of VL Subtitles—This can be explained as User Selected Language script of Video Language subtitles. The scenario is further explained using an example. Consider Video language as English. User selected language as Kannada (Language of one of state in India). For a dialog in the video "What is happening"
English script—What is happening?
Kannada script of English—ವಾಟ್ಇಸ್ಸಾ ಪನಿಂಗ್
This is not the translation. It is the script written in Kannada of the English dialog.

Another scenario: CL script of VL Subtitles—This can be explained as Country Language script of Video Language subtitles. The scenario is further explained using an example. Consider Video language as English. User selected language as Kannada (state/domicile language of India). Country Language is Hindi (national/country language of India). For a dialog in the video "What is happening"
English (VL) dialog—What is happening?
Kannada (USL) script of English—ವಾಟ್ಇಸ್ಸಾ ಪನಿಂಗ್
Hindi (CL) script of English—क्याहोरहाहै
This is not the translation. It is the script written in Hindi.

Another scenario: WL script of VL Subtitles—This can be explained as World Language (English) script of Video Language subtitles. The scenario is further explained using an example. Consider Video language as Hindi. User selected language as French. World Language is English. For a dialog in the video "Kya ho rahahai" in Hindi
Hindi Script—क्याहोरहाहै
English script of Hindi—Kya ho rahahai.
This is not the translation. It is the script written in English.

There are so many languages in the world. It is not possible to define the alternative scripts for each individual language. English is the worldwide language, so English script is used most, according to one embodiment of the invention. Also one important thing to consider is English is not spoken in all the countries. Most of Chinese people do not know English, so in such cases, we may need to adopt mandarin (Chinese) script. Also in Northern parts of India, Hindi is more popular language, Hindi script will be adopted. If the intended audience knows English, then English script will be adopted, otherwise language of the country of the user will be adopted for subtitles.

Script language always tends towards English then to country/national language of the user (closest language of the user).

Questionnaires are related to the video and content shown in the video. Questions script can be user preferred language or in the script of influential language in the geographical language of the user.

Questions can be in any format, like fill in the blank questions, multiple choice questions etc. Some examples of questionnaire are mentioned below:

Questions are based on video and related to artists/production/actors shown in the video and related to them. Some sample Questions include
Who is artist in the video?
Who is actor in the video?
Who is actress in the video?
Which Company/Studio/Production House had produced the video?
Who is the director?
Fill in the blanks Questions
From the video, complete the word.
Some people call me Ram, Krishna, Yahveetc . . . .
If Sony has produced current video, the question could be
From below list select the video produced by Sony.

Questions will be available in the language selected by the user. The questions will appear in English, if user had selected English in the languages list. The questions will appear in Japanese if the user selects Japanese in language selection.

Questions and Video need not always be in the same language. For a video produced in English and user selection language is French, the video will appear in English or French, but the questions will be in French.

Questions script can be in different Language from user selected language. This will be helpful, if certain language scripts are not compatible or can't be easily written and posted as questions. For example, if user selects Kannada (One of Indian State/Domicile language) as Language, the questions will be in Kannada, but the script can be in Kannada or English (Influential language). The Question is, who is artist/actor shown in the video? This one question is presented in Kannada as below in two ways.
Part 1: With Kannada Script
ಈವೀಡಿಯೋಅಲ್ಲಿ ಇರುವಹೀರೂ ಆಕ್ಟರುಯಾರು?
(Meaning—who is hero/actor shown in the video written in Kannada Language)
a). ಜಾಕಿಚಾನ್ (Means Jackie Chan)
b). ಕ್ರಿಸ್ಟಿಯನ್ಬೇಲ್ (Means Christian Bale)
c). ಕ್ರಿಸ್ಇವಾನ್ಸ್ (Means Chris Evans)
Part 2: With English Script of Kannada
Ee video alliiruvaherohesaruenu?
(Meaning—who is artist/actor shown in the video. Written in Kannada language, English Script)
a). Jackie Chan
b). Christian Bale
c). Chris Evans
In Part 1 Question is presented in Kannada, In Part 2 language is Kannada but script is English. Similarly, the Hindi script can be adopted. Most often English script will be taken as it is the international language, but if some other language is stronger in that particular geography (example Japan—Japanese) then such a language can be used.

For each of the content, the content can be available in one or more languages. For example movie trailer of a Hollywood movie can be available in English, Hindi, Spanish, Chinese etc. The availability of content in particular language depends on the intended audience for the content. For a movie trailer produced in English and if the audience is worldwide then content is available in more than one language. Hence content can be available in more than one language but not all languages. In how many and which all languages the audio or video content or text content shall be available on the server.

The processor takes the preferred language input from the input device and compares it with language availability of the content to determine whether preferred language matches with available content language. If preferred language matches, then the processor renders the content based on the matched content language. If user preferred language does not match with available content languages then content and text are fetched in accordance with the language of highest influence using language influence index.

In the system, input devices can be a keyboard, a touch screen interface, mouse, etc. The input device receives a content selection input from the user for selecting a video or audio content for viewing from a set of contents, wherein the content is available in one or more languages.

In the website/App one or more contents are available. The user can select different contents as content selection input, like video in general, or music video or movie video. Some examples are as follows:

User can select Lines Short movie from available content list.

User can select Iron man movie from available content list.

User can select Justin Briber—Baby music from available content list.

Preferred language is determined based the language of the content selected by the user, or geographical location of the user, or type of content, or combination thereof.

Preferred language is determined dynamically and set as default language and/or user can also select a language of one's choice, then the selected language becomes preferred language.

User selects the Language from the available languages. Languages selection option is presented in list, grid or in any other method. The languages available for selection indicate that same content is available in more than one language. These depend on the intended audience. For video produced in English and if the audience is worldwide then more than one language will be available for selection. The languages available for selection can be English, Hindi, Spanish, Dutch, and French etc.

In a preferred embodiment, the preferred language is provided as default without an option to an user to select a preferred language. Default language differs based on the type of content. Default language priorities are different for different video types and language influence index.

For video contents, one language is set as default language, out of all the available languages in which the content is available. This language serves user selected language until the user makes a change in the language selection. This depends on two conditions a) Video production language b) the geography of the user who is consuming the content.

For regions where video language has no influence then user's language becomes default language. For example, consider Hindi video for the china user then Mandarin becomes default language.

For English video in India, Hindi or English can be default language. If the contest is not available then it will be set to closest language of the user, available for selection.

This is determined based on the language influence index applicable to geographical location of the user. If the video produced in English and user is located at English speaking country then English will be default language.

For videos in English and if the user in USA the default language is set as English, whereas for the same video contest the default language could be English or Hindi if the user is in India. For Hindi videos, if the user is located in India the default language is Hindi. For French videos, if the user is in French speaking country then the default language is French.

In case of music related contents, whether video or audio, one of the languages in which music is available is set as default language. This depends on the geography of the user who is taking the contest and language in which music video is produced. Priority for the default language is as below.

Video Produced Language

World Language like English

Language corresponding to the geographical location of the user

Conditions governing the priority:

If the video produced language has the influence over the user's region, then it will be the default language.

If Video language has no influence then English (World Language) will become default language.

If both Video language and English has no influence over the user's region then user geographical language becomes default language.

This means that in most cases default language for the music video will be the language in which the music video is produced. But if the user is located in such a geographical location where language of video has no influence or less influence, then language closest to the user is set as default language. If the music video produced in English and user is located at English speaking country then English will be default language. If music video in English and if the user in USA, then the default language is English. For Hindi music videos, if the user is located in India the default language is Hindi. For French music videos, if the user is in French speaking country then the default language is French.

Some examples:

If the music video is in English (Like music videos produced in USA)

If the content consumer is in located in USA then default language for selection is English.

If the music video is in Hindi (like Typical Indian Hindi movies)

If the contest taker is located in India, then default language is Hindi.

If the contest taker is located USA (not in primary market), then default language becomes English or Hindi.

In some cases, default language shall be overridden, and in such cases Video language and English overrides the default language even though user geographical location indicates another language as default language.

Most of the times it is necessary to retain the originality of the video, so video language is set as default language. This is explained as, for example, Consider the user in India, for English videos in India, English is set as the default language. For Hindi Videos, Hindi will be set as default language.

In one embodiment, English, being a worldwide language, overrides default language. For example, French videos in India, English will be set as default language.

To summarize, Music audio or video content, default language tends towards video language and then world language and then user geographical location. However in order to retain the originality of the music, the default language tends towards Video language if the video is in world language and if the video is in distinct country/domicile language, then default language is one of two factors video language or English (World language), depending on the intended audience.

For movie video content, one language is set as default out of all the available languages for the contest. This depends on the geography of the user who is taking the contest and language in which Movie video is produced. This is explained as, consider the example below a) If the intended audience is India, then English or Hindi becomes the default language.
    b) If the intended audience is China, then Mandarin becomes default language.
    c) If the intended audience is Japan, then Japanese becomes default language.

In most cases, default language is the language of the country in which user is located, if the contest is available in that particular language. If the contest is not available then it will be set to closest language of the user available for selection based on language influence index.

If the Movie video produced in English and user is located at English speaking country then English will be default language.

The invention is further explained through various examples.

FIG. 2 illustrates an exemplary implementation of an embodiment of the invention, where contents are video contents. The example is shown as an online contest being taken by a user, by consuming contents in a preferred language and further answering the questions to take the contest.

Users visit the website or Mobile Application (App) which implements the invention. User can sign in or create a profile using signup.

Step 201: Video Selection—In the website/App one or more contests are available. User selects the video, which user wants to take part in quiz contest. For Example, if user wants to take part in "Short movie", user selects the same from available contests list. Once the user selects the video, then the user is directed to the next screen/same screen where quiz contest is present.

Step 202: Language Selection—User selects the Language from the available languages for the contest. Languages options are presented in drop down manner. This can be extended to grid manner or list manner. The languages available for selection indicate that same contest can be taken in different languages. The availability of languages depends on the intended audience. For video produced in English, and if the audience is worldwide then more than one language will be available for selection. The languages available for selection can be English, Hindi, Spanish, Dutch, and French etc.

In language selection, one language is set as default out of all the available languages in which the contest is available. This language serves user selected language until user makes the change. This depends on two conditions a) Video production language b) the geography of the user who is taking the contest. For regions where video language has no influence then user's language becomes default language. For example, consider Hindi video for the china user then Mandarin becomes default language. For English video in India, Hindi or English can be default language. If the contest is not available then it will be set to closest language of the user, available for selection. If the video produced in English and user is located at English speaking country then English will be default language. For videos in English and if the user in USA the default language is set as English, whereas for the same video contest the default language could be English or Hindi if the user is in India. For Hindi videos, if the user is located in India the default language is Hindi. For French videos, if the user is in French speaking country then the default language is French.

Selection of the language, controls the language in which questions will appear/available.
For example, if user chooses English, the questions will appear/available in English. If user chooses French, the questions will appear/available in French. However, the questions script can be in world language like English or some other language.

Language selection controls the language in which video and subtitles play/appear/available.

Play/appearance of video is important part. The video and subtitles will appear/play depends on language selected by the user. The playing of video along with subtitles or without subtitles and the language of the subtitles and script of the subtitles—depends on several factors like language in which video is produced and language selected by the user.

Step 203: Appearance or Playing of Video and Subtitles—Play/appearance of video is important part. The video and subtitles will appear/play depends on language selected by the user. The playing of video along with/without subtitles and the language of the subtitles depends on factors like language in which video is produced and language selected by the user. For one particular Video and one particular language selection, there will be one video play/appear for the user. The following below scenarios explain how the priority is decided.

The considerations are video production language (VL), user selected language (USL), and Worldwide language (WL), Country Language (CL).

Some significant aspects of the Video appearance are explained further.

Subtitles Script and Translated subtitles script: Subtitles depends on language in which video is produced and user selected language. Based on these, particular algorithm is applied and subtitles language is determined. Subtitles language is a factor to be considered. For some languages, it is difficult to use them and difficult to write, post them either as subtitles or questions. In such cases the world language like English script or script of the language which is second best to the user is taken. Subtitles script and questions script always tends towards English. For most cases English script is adopted. Adoption of different script also depends on country of the user and language which is stronger in that particular region.

One important thing to note here is that subtitles language and subtitles script are two different things. For example, in India both English and Hindi are stronger. For Indian state languages subtitles, then English script or Hindi script can be adopted.

Consider the scenario, where subtitles are translation of VL:
Video in VL, subtitles as Translation in USL, then subtitles script options are
    a. Subtitles Script can be in USL
    b. Subtitles Script can be in English/WL or CL of the user
Consider, Subtitles Language=x (x holds the value of subtitles language)

Then subtitles can be: (a) x (b) English/WL script of x (c) CL script of x

This explains subtitles script can be different from subtitles languages. These scripts if not in USL, tend towards international (English) and national languages i.e. will be in English (International language), national language or second best language for the user.

EXAMPLE 1

Video in English, subtitles as Translation in Hindi, then subtitles script options are Subtitles Script can be in Hindi Subtitles Script can be in English/WL script of Hindi

EXAMPLE 2

Video in English, subtitles results in Translation in Kannada, then subtitles script options are Subtitles Script can be in Kannada Subtitles Script can be in English/WL script of Kannada Subtitles Script can be in Hindi/CL script of Kannada Here English is international language and Hindi is the country language of India.

USL script of VL Subtitles: This can be explained as User Selected Language script of Video Language subtitles. For example, consider Video language as English. User selected language as Kannada (Language of one of state in India).

For a dialog in the video "What is happening"

English script—What is happening?

Kannada script of English— ವಾಟ್ಇಸ್ಸ್ ಪನಿಂಗ್

This is not the translation. It is the script written in Kannada of the English dialog. CL script of VL Subtitles: This can be explained as Country Language script of Video Language subtitles. For example, consider Video language as English. User selected language as Kannada (state/domicile language of India). Country Language is Hindi (national/country language of India).

For a dialog in the video "What is happening"

English (VL) dialog—What is happening?

Kannada (USL) script of English— ವಾಟ್ಇಸ್ಸ್ ಪನಿಂಗ್

Hindi (CL) script of English— क्याहोरहाहै

This is not the translation. It is the script written in Hindi.

WL script of VL Subtitles: This can be explained as World Language (English) script of Video Language subtitles. For example, consider Video language as Hindi. User selected language as French. World Language is English.

For a dialog in the video "Kya ho rahahai" in Hindi

Hindi Script— क्याहोरहाहै

English script of Hindi—Kya ho rahahai.

This is not the translation. It is the script written in English.

There are so many languages in the world. It is not possible to define the alternative scripts for each individual language. English is the worldwide language, so English script is used most. Also one important thing to consider is English is not spoken in all the countries. Most of Chinese people do not know English, so in such cases, we may need to adopt mandarin (Chinese) script. Also in Northern parts of India, Hindi is more popular language, Hindi script will be adopted. If the intended audience knows English, then English script will be adopted, otherwise language of the country of the user will be adopted for subtitles.

Script language always tends towards English then to country/national language of the user (closest language of the user).

For particular combination of Video Language (VL) and User Selected Language (USL), certain algorithm is used. These algorithms define how video and subtitles play/appear. There are various options for each of the formats. Priority option for the video and subtitles play/appear is defined for each of the algorithm. Priority follows the path option a, option b, option c to option n. Also there is most used option. Most used option indicates which of the option has possibility of appearing most of the times. This most used option tends towards English.

Basically priority is defined in the following way.

Provide the subtitles as translation in User Selected Language.

Provide the subtitles as translation in World/Country Language of the user.

Provide the subtitles as script in User selected language corresponding to the video.

Provide the subtitles as script in World/Country Language corresponding to the user.

If all the above options are not applicable then provide the subtitles in Video language.

When no subtitles are available then provide the video with no subtitles.

In most cases, second condition is met and user is provided with subtitles as translation in English (world language)/country language.

Algorithms and Standard Formats:

Video language and User selected language is same. (Standard Format 1)

Video in worldwide language like English, User selected language is not worldwide language, any language. (Standard Format 2)

Video is not in worldwide language and any language, User selected language is in worldwide language like English. (Standard Format 3)

Both Video and User selected language are not worldwide language, country languages. (Standard Format 4)

Video language and User selected languages are state/domicile languages within a country (for example Languages of country India, different states of India have different languages)—(Standard Format 5)

Video language is country language and User selected language is state/domicile language of another country—(Standard Format 6)

Video language is state/domicile language of one country language and User selected language country language of another country (Standard Format 7)

Standard Format 1: Video language and User selected language is same.

Video and Subtitles—Options and Priority

Video available in VL, with subtitles in VL (If subtitles available in VL)

Video available in VL, with No subtitles

Questions—VL

Generally, preferred option shall be "b". In order to retain the originality of the video, video without subtitles option is preferred. This also applicable to situations where subtitles are not available. However in situations where user is not a primary adherent or less well versed with the language to the video language then option a, is preferred.

EXAMPLE 1

Video production language—English

User selected language—English

Then Quiz contest will be available on this method.

Video and Subtitles—Options and Priority

Video available in English, with subtitles in English
Video available in English, with No subtitles
Questions—English
Most Used Option—b
In order to retain the originality of the video, video without subtitles option is preferred. This also applicable to situations where subtitles are not available. However in situations where user is not primary adherent to the video language then option a, is preferred.

EXAMPLE 2

Video production language—Hindi
User selected language—Hindi
Then Quiz contest will be available on this method.
   Video and Subtitles—Options and Priority
      Video available in Hindi, with subtitles in Hindi
      Video available in Hindi, with No subtitles
   Questions—Hindi
Most Used Option—b
In order to retain the originality of the video, video without subtitles option is preferred. This also applicable to situations where subtitles are not available. However in situations where user is not primary adherent to the video language then option a is preferred.
   Standard Format 2: For Video Language is World language like English and User selected language is not world language. Then Video Contest will be available on this method.
   Video and Subtitles—Options and Priority
      Video available in VL, with Translation in USL as subtitles.
      Video available in VL, with USL script of VL Subtitles.
      Video available in VL, with Subtitles in VL.
      Video available in VL, with No Subtitles.
   Questions—USL
Most Used Option—c
Options a, b are less probable. Again option a can used with English script. Assumption is made that subtitles is available in USL and VL. If subtitles not available in USL, then options a, b are not applicable and priority shifts to option c. If subtitles not available in VL, then option c is not applicable and priority shifts to option d.

EXAMPLE 1

Video production language—English
User selected language—Hindi
Then Video Contest will be available on this method.
   Video and Subtitles—Options and Priority
      Video available in English, with Translation in Hindi as subtitles (If subtitles available in USL).
      Video available in English, with Hindi script of English Subtitles (If subtitles available in USL).
      Video available in English, with Subtitles in English.
      Video available in English, with No subtitles.
   Questions—Hindi
Most Used Option—a, c
Options b is less probable. Again option a can used with English script.
Note: Assumption is made that subtitles is available in Hindi and English. If subtitles not available in Hindi, then options a, b are not applicable and priority shifts to option c. If subtitles not available in English, then option c is not applicable and priority shifts to option d.

EXAMPLE 2

Video production language—English
User selected language—Japanese
Then Video Contest will be available on this method.
   Video and Subtitles—Options and Priority
      Video available in English, with Translation in Japanese as subtitles (If subtitles available in USL).
      Video available in English, with Japanese script of English Subtitles (If subtitles available in USL).
      Video available in English, with Subtitles in English.
      Video available in English, with No Subtitles.
   Questions—Japanese
Assumption is made that subtitles is available in Hindi and English. If subtitles not available in Hindi, then options a, b are not applicable and priority shifts to option c. If subtitles not available in English, then option c is not applicable and priority shifts to option d.
   Standard Format 3: For Videos in language other than English/World Language and user selected Language is World Language/English.
Video production language—VL
User selected language—USL
Then contest will be available on this method.
   Video and Subtitles—Options and Priorities
      Video available in VL, with Translation in USL as subtitles.
      Video available in VL, with USL script of VL Subtitles.
      Video available in VL, with Subtitles in VL.
      Video available in VL, with No Subtitles.
   Questions—USL
Assumption is made that subtitles is available in USL and VL. If subtitles not available in USL, then options a, b are not applicable and priority shifts to option c. If subtitles not available in VL, then option c is not applicable and priority shifts to option d.

EXAMPLE 1

Video production language—Hindi
User selected language—English
Then Video Contest will be available on this method.
   Video and Subtitles—Options and Priority
      Video available in Hindi, with Translation in English as subtitles.
      Video available in Hindi, with English script of Hindi Subtitles.
      Video available in Hindi, with Subtitles in Hindi.
      Video available in Hindi, with No Subtitles.
   Questions—English
Assumption is made that subtitles is available in English and Hindi. If subtitles not available in English, then options a, b are not applicable and priority shifts to option c. If subtitles not available in Hindi, then option c is not applicable and priority shifts to option d.
   Standard Format 4: Both Video Language and User selected language are other than English/WL, but two different country languages.
Video production language—VL
User selected language—USL
World Language—WL
World Language/English acts as a medium. Then contest will be available on this method.
   Video and Subtitles—Options and Priority
      Video available in VL, with Translation in USL as subtitles.
      Video available in VL, with Translation in WL as subtitles.
      Video available in VL, with USL script of VL Subtitles.
      Video available in VL, with WL script of VL Subtitles.
      Video available in VL, with Subtitles in VL.

Video available in VL, with No Subtitles.
Questions—USL
Most Used Option—b
Assumption is made that subtitles is available in USL, WL and VL. Option a, and option b intends to provide the translation to the user. Option c and option d intends to provide the script to the user if translation is not available. If subtitles not available in USL, then options a, is not applicable. If subtitles not available in WL, then options b is not applicable. If subtitles not available in VL, then option e is not applicable.

EXAMPLE 1

Video production language—Hindi
User selected language—Japanese
World Language—WL/English
Then Video Contest will be available on this method.
   Video and Subtitles—Options and Priority
      Video available in Hindi, with Translation in Japanese as subtitles.
      Video available in Hindi, with Translation in English as subtitles.
      Video available in Hindi, with Japanese script of Hindi Subtitles.
      Video available in Hindi, with English script of Hindi Subtitles.
      Video available in Hindi, with Subtitles in Hindi.
      Video available in Hindi, with No Subtitles.
   Questions—Japanese
Most Used Option—b
Assumption is made that subtitles is available in Japanese, English and Hindi. If subtitles not available as translation in Japanese/English, then options a, b are not applicable. If subtitles not available as script in Japanese/English, then options c, d not applicable. If subtitles not available in Hindi, then option e is not applicable.
   Standard Format 5: For both, video language and USL are state/domicile languages within a country.
Video Language—VL
User selected language—USL
World Language—WL
Country Language—CL (Example: Hindi—Indian Country Language
Then contest will be available on this method.
   Video and Subtitles—Options and Priorities
      Video available in VL, with Translation in USL as subtitles.
      Video available in VL, with Translation in CL/WL as subtitles.
      Video available in VL, with USL script of VL Subtitles.
      Video available in VL, with CL/WL script of VL Subtitles.
      Video available in VL, with Subtitles in VL.
      Video available in VL, with No Subtitles.
   Questions—USL
Assumption is made that subtitles is available in USL, WL, CL and VL. If subtitles not available as translation in USL and WL/CL, then options a, b are not applicable. If subtitles not available as script in USL and WL/CL, then options c and d are not applicable. If subtitles not available in VL, then option f is not applicable. The priority shifts according to the fulfillment or non fulfillment of various options.

EXAMPLE 1

Video Language—Kannada
User selected language—Marathi
World Language—English
Country Language—Hindi
Then contest will be available on this method.
   Video and Subtitles—Options and Priorities
      Video available in Kannada, with Translation in Marathi as subtitles.
      Video available in Kannada, with Translation in Hindi/English as subtitles.
      Video available in Kannada, with Marathi script of Kannada Subtitles.
      Video available in Kannada, with Hindi/English script of Kannada Subtitles.
      Video available in Kannada, with Subtitles in Kannada.
      Video available in Kannada, with No Subtitles.
   Questions—Marathi
Most Used Option—b
Assumption is made that subtitles is available in USL, WL, CL and VL. If subtitles not available as translation in USL and WL/CL, then options a, b are not applicable. If subtitles not available as script in USL and WL/CL, then options c and d are not applicable. If subtitles not available in VL, then option f is not applicable. The priority shifts according to the fulfillment or non fulfillment of various options.
   Standard Format 6: Video Language is state/domicile language of one country and
User selected language is country language of another country.
Video production language—VL
User selected language—USL
World Language—WL
World Language/English acts as a medium.
Then contest will be available on this method.
   Video and Subtitles—Options and Priority
      Video available in VL, with Translation in USL as subtitles.
      Video available in VL, with Translation in WL as subtitles.
      Video available in VL, with USL script of VL Subtitles.
      Video available in VL, with WL script of VL Subtitles.
      Video available in VL, with Subtitles in VL.
      Video available in VL, with No Subtitles.
   Questions—USL
Most Used Option—b
Assumption is made that subtitles is available in USL, WL and VL. Option a, and option b intends to provide the translation to the user. Option c and option d intends to provide the script to the user if translation is not available. If subtitles not available in USL, then options a, is not applicable. If subtitles not available in WL, then options b is not applicable. If subtitles not available in VL, then option e is not applicable.

EXAMPLE 1

Video production language—Kannada
User selected language—French
World Language—WL/English
Then Video Contest will be available on this method.
   Video and Subtitles—Options and Priority
      Video available in Kannada, with Translation in French as subtitles.
      Video available in Kannada, with Translation in English as subtitles.
      Video available in Kannada, with French script of Kannada Subtitles.
      Video available in Kannada, with English script of Kannada Subtitles.

Video available in Kannada, with Subtitles in Kannada.
Video available in Kannada, with No Subtitles.
Questions—French
Most Used Option—b
Assumption is made that subtitles is available in French, English and Kannada. If subtitles not available as translation in French/English, then options a, b are not applicable. If subtitles not available as script in French/English, then options c, d not applicable. If subtitles not available in Kannada, then option e is not applicable.

Standard Format 7: Video language is country language and USL is state/domicile language of another country.
Video Language—VL
User selected language—USL
World Language—WL
Country Language—CL (Example: Hindi—Indian Country Language)
Then contest will be available on this method.
    Video and Subtitles—Options and Priorities
        Video available in VL, with Translation in USL as subtitles.
        Video available in VL, with Translation in CL/WL as subtitles.
        Video available in VL, with USL script of VL Subtitles.
        Video available in VL, with CL/WL script of VL Subtitles.
        Video available in VL, with Subtitles in VL.
        Video available in VL, with No Subtitles.
    Questions—USL
Most Used Option—b
Assumption is made that subtitles is available in USL, WL, CL and VL. If subtitles not available as translation in USL and WL/CL, then options a, b are not applicable. If subtitles not available as script in USL and WL/CL, then options c and d are not applicable. If subtitles not available in VL, then option f is not applicable. The priority shifts according to the fulfillment or non fulfillment of various options.

EXAMPLE 1

Video Language—French
User selected language—Marathi
World Language—English
Country Language—Hindi
Then contest will be available on this method.
    Video and Subtitles—Options and Priorities
        Video available in French, with Translation in Marathi as subtitles.
        Video available in French, with Translation in Hindi/English as subtitles.
        Video available in French, with Marathi script of French Subtitles.
        Video available in French, with Hindi/English script of French Subtitles.
        Video available in French, with Subtitles in French.
        Video available in French, with No Subtitles.
    Questions—Marathi
Most Used Option—b
Assumption is made that subtitles is available in Marathi, WL (English), CL (Hindi) and French. If subtitles not available as translation in Marathi, and WL (English)/CL (Hindi), then options a, b are not applicable. If subtitles not available as script in Marathi and WL (English)/CL (Hindi), then options c and d are not applicable. If subtitles not available in French, then option f is not applicable. The priority shifts according to the fulfillment or non fulfillment of various options.

Indian Languages as USL: This is applicable to Indian languages (USL User Selected Language). Primary example for medium is—if scripts are not available is USL, which language should be considered. For example, the subtitles language is Marathi and scripts not available for Marathi, then English/Hindi scripts can be used. Since in India, English is strong is some regions (as a second language to native language) and Hindi is strong in most of India (native language and as a second language to native language). In case of regions in India where native languages are Kannada, Tamil, Telugu, and Malayalam, the second language, stronger after native language is English. English language acts as a medium In northern part of India and most of the country, Hindi is stronger. Hindi acts as a medium.
Basic Format is:
    Stronger English—If USL is Kannada, Tamil, Telugu and Malayalam then English is medium.
    Stronger Hindi—If other Indian state/domicile languages then Hindi is the medium.
    English is rising in India, so it will eventually replace Hindi as a medium.

Step 204: Presentation of Contest Questions—Once the video is consumed, thereafter the Questions related to the video are presented. Questions can be in any format. Fill in the blank questions, multiple choice questions etc.

Questions are based on video and related to artists/production/actors shown in the video and related to them. Some sample Questions include
    Who is artist in the video?
    Who is actor in the video?
    Who is actress in the video?
    Which Company/Studio/Production House had produced the video?
    Who is the director?
    Fill in the blanks Questions
        From the video, complete the word.
        Some people call me Ram, Krishna, Yahveetc . . . .
    If Sony has produced current video, the question could be
        From below list select the video produced by Sony.

Questions will be available in the language selected by the user. The questions will appear in English, if user had selected English in the languages list. The questions will appear in Japanese if the user selects Japanese in language selection.

Questions and Video need not always be in the same language. For a video produced in English and user selection language is French, the video will appear in English or French, but the questions will be in French.

Questions script can be in different Language from user selected language. This will be helpful, if certain language scripts are not compatible or can't be easily written and posted as questions. For example, if user selects Kannada (One of Indian State/Domicile language) as Language, the questions will be in Kannada, but the script can be in Kannada or English.

The Question is who is artist/actor shown in the video? This one question is presented in Kannada as below in two ways.
    Part 1: With Kannada Script
ಈವೀಡಿಯೋಅಲ್ಲಿ ಇರುವಹೀರೋ ಹೆಸರುಏನು?
(Meaning—who is hero/actor shown in the video written in Kannada Language)
a). ಜಾಕಿಚಾನ್ (Means Jackie Chan)
b). ಕ್ರಿಸ್ಟಿಯನ್‌ಬೇಲ್ (Means Christian Bale)
c). ಕ್ರಿಸ್‌ಇವಾನ್ಸ್ (Means Chris Evans)

Part 2: With English script of Kannada
Ee video alliiruvaherohesaruenu?
(Meaning—who is artist/actor shown in the video. Written in Kannada language, English Script)
a). Jackie Chan
b). Christian Bale
c). Chris Evans In Part 1 Question is presented in Kannada, In Part 2 language is Kannada but script is English. Similarly, the Hindi script can be adopted. Most often English script will be taken as it is the international language, but if some other language is stronger in that particular geography (example Japan—Japanese) then such a language can be used.

Step 205: Save and Submit Options—Once the user takes the contest, following user input options are provided
   Save button the user can save the contest for future submission.
   Submit button the user can submit the contest.

Step 206: Winners Selection—One or more lucky winners are chosen from the users who had and taken the contest and answered correctly.

Figure 3:
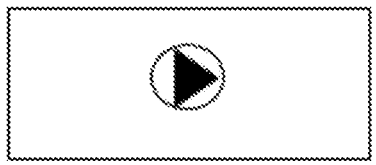
FIG. 3 illustrates an exemplary implementation of an embodiment of the invention, where contents are music video or audio.

FIG. 3 illustrates an exemplary implementation of an embodiment of the invention, where contents are music video or audio. The example is shown as an online contest being taken by a user, by consuming contents in a preferred language and further answering the questions to take the contest.

Users visit the website or Mobile Application (App) which implements the invention. User can sign in or create a profile using signup.

Step 301: Music Video Selection—In the website/App one or more contests are available. User selects the music video, which user wants to take part in quiz contest. For example, if user wants to take part in "Justin Beiber Baby" contest, user selects the same from the Music videos available. Once the user selects the music video, then the user is directed to the next screen/same screen where quiz contest is present.

Step 302: Language Selection—User selects the Language from the available languages for the contest. Languages options are presented in drop down manner or in list manner or in grid manner or in any other manner Factors related to language selection
   Language selection determines Video and Subtitles
   Language selection determines Question language
   Available languages for selection
   Default language
   Default language—it is considered as user selected language, until user changes the language.
   Video language Overriding other languages for default language
   World language (English) overriding other languages for default language Languages available for selection depend on the intended audience. For music video in English, if the audience is worldwide then more than one language will be available for selection. The languages for selection can be English, Hindi, Spanish, Dutch, and French etc. These languages indicate that same contest can be taken in different languages.

Default language is considered as user selected language until user changes the language. One of the languages in which music is available is set as default language. This depends on the geography of the user who is taking the contest and language in which music video is produced. Priority for the default language is as below.
   Video Produced Language
   World Language like English
   Language corresponding to the geographical location of the user
   Conditions governing the priority:
   If the video produced language has the influence over the user's region, then it will be the default language.
   If Video language has no influence then English (World Language) will become default language.
   If both Video language and English has no influence over the user's region then user geographical language becomes default language.

This means that in most cases default language for the music video will be the language in which the music video is produced. But if the user is located in such a geographical location where language of video has no influence or less influence, then language closest to the user is set as default language. If the music video produced in English and user is located at English speaking country then English will be default language. If music video in English and if the user in USA, then the default language is English. For Hindi music videos, if the user is located in India the default language is Hindi. For French music videos, if the user is in French speaking country then the default language is French.

Some examples:
   If the music video is in English (Like music videos produced in USA)
      If the contest taker is in located in USA then default language for selection is English.
   If the music video is in Hindi (like Typical Indian Hindi movies)
      If the contest taker is located in India, then default language is Hindi.
      If the contest taker is located USA (not in primary market), then default language becomes English or Hindi.

In certain scenario, default language shall be overridden. Overriding is the scenario in which Video language and English overrides the default language (i.e., set as default language) even though user geographical location indicates another language as default language.
   Video production language as default language—Most of the times it is necessary to retain the originality of the video, so video language is set as default language. This is explained as, for example, consider the user in India, for English videos in India, English is set as the default language. For Hindi Videos, Hindi will be set as default language.
   English (Worldwide language) as default language— Since English is worldwide language, so English can be set as default language. For example, French videos in India, English will be set as default language.

Until user makes change to the default language or user selects another language, the default language is considered as the user selected language.

Selection of the Language controls the language in which questions will appear/available.

Contest Questions appear/available in the user selected language. For example, if user chooses English, the questions will appear/available in English. If user chooses French, the questions will appear/available in French.

The questions script can be in different language. For example, if the user chooses Hindi, the questions will appear in Hindi, but the script can be Hindi or English.

Language Selection determines the language in which Music video and subtitles play/appear/available. Music video is important part. The music video and subtitles will appear/play based on the language selection. The playing of music video along with subtitles or without subtitles and the language of the subtitles depends on several factors like language in which music video is produced and language selected by the user.

Step 303: Playing or Appearance of Music Video and Subtitles—The music video and subtitles will appear/play in one of the languages, available for selection. The playing of music video along with subtitles or without subtitles and the language of the subtitles depends on several factors like language in which music video is produced and language selected by the user. For each of the cases, even though priority is considered, English is the most used language for the subtitles, since it is worldwide language and used for official communication in most parts of the world.

Different scenarios exist for music video language and user selected language
- Music video language and User selected language is same. (Standard Format 0).
- Music video in worldwide language like English, User selected language is not worldwide language. (Standard Format 1).
- Music video is not in worldwide language, User selected language is in worldwide language like English. (Standard Format 2).
- Both Music video and User selected language are not worldwide language. (Standard Format 3).
- Music video language is country language but not Indian, User selected language is Indian state language
- Music video language is Indian state language and User selected language is country language but not Indian
- Music video language is Indian state language and User selected language is Indian state language. (Standard Format 4)—Different states in India have different languages.

Standard Format 0:
Music Video language and User selected language is same
Music video production language—MVL
User selected language—USL
Then Music contest will be available on this method.
  Music Video and Subtitles—Options and Priority
    Music video play/available in MVL, with no Subtitles
    Music video play/available in MVL with Lyrics in MVL as subtitles
  Questions—MVL If the Music Video and User selection Language is same, then music video appears without subtitles. In some particular cases the video appears with subtitles. If the user is not a primary adherent to the language and video language is less powerful in user's region then the video appears with subtitles. Even if the video language is not used and less common like Sanskrit or complex language then the video appears with subtitles. This essentially means that the same contest may appear without subtitles to native language users and appear with subtitles in the region where the video language is not so powerful.

EXAMPLE 1

Music video language—English
User selected language—English
Then Music contest will be available on this method.
  Music Video and Subtitles—Options and Priority
    Music video play/available in English, with no Subtitles
    Music video play/available in English with Lyrics in English as subtitles
  Questions—English

EXAMPLE 2

Music video language—Hindi
User selected language—Hindi
Then Music contest will be available on this method.
  Music Video and Subtitles—Options and Priorities
    Music video play/available in Hindi, with no Subtitles
    Music video play/available in Hindi with Lyrics in Hindi as subtitles
  Questions—Hindi

EXAMPLE 3

For Complex or less used languages.
Music video language—Sanskrit
User selected language—Sanskrit
Then Music contest will be available on this method.
  Music Video and Subtitles—Options and Priorities
    Music video play/available in Sanskrit with subtitles
    Music video play/available in Sanskrit, with no Subtitles
  Questions—English/Hindi/Sanskrit
For Sanskrit, the subtitles lyrics script can Sanskrit, Hindi or English.

Standard Format 1:
For music videos in English/World Language, and USL is other than World language, any language.
Music video production language—MVL
User selected language—USL
Then Music contest will be available on this method.
  Music Video and Subtitles—Options and Priorities
    Music video play/available in MVL, with Lyrics in USL as subtitles
    Music video play/available in MVL, with Lyrics in MVL as subtitles
    Music video play/available in MVL, with No Subtitles
    Music video play/available in MVL, with Meaning in USL as subtitles
  Questions—USL
Most used option—Second priority is most used option.

EXAMPLE 1

Music video production language—English
User selected language—Hindi
Then Music contest will be available on this method.
  Music Video and Subtitles—Options and Priorities
    Music video play/available in English, with Lyrics in Hindi as subtitles
    Music video play/available in English, with Lyrics in English as subtitles
    Music video play/available in English, with No Subtitles
    Music video play/available in English, with Meaning in Hindi as subtitles
  Questions—Hindi
Most used option—Second priority is most used option (English Subtitles).

EXAMPLE 2

Music video production language—English
User selected language—Japanese
Then Music contest will be available on this method.
  Music Video and Subtitles—Options and Priorities Music video play/available in English, with Lyrics in Japanese as subtitles
Music video play/available in English, with Lyrics in English as subtitles
Music video play/available in English, with No Subtitles
Music video play/available in English, with Meaning in Japanese as subtitles
Questions—Japanese Most used option—Second priority is most used option (English Subtitles).

Standard Format 2:

For music videos other than English/World Language, any language and user selected Language is World Language/English
Music video production language—MVL
User selected language—USL
Then Music contest will be available on this method.
 Music Video and Subtitles—Options and Priorities
  Music video play/available in MVL, with Lyrics in USL as subtitles
  Music video play/available in MVL, with Lyrics in MVL/Meaning in USL as subtitles
  Music video play/available in MVL, with No Subtitles
 Questions—USL

EXAMPLE

Music video production language—Hindi
User selected language—English
USL=WL=English
Then Music contest will be available on this method.
 Music Video and Subtitles—Options and Priorities
  Music video play/available in Hindi, with Lyrics in English as subtitles
  Music video play/available in Hindi, with Lyrics in Hindi/Meaning in English as subtitles
  Music video play/available in Hindi, with No Subtitles
 Questions—English In most of the scenarios, first priority is always met. Music video will play with English subtitles.

Standard Format 3:

For both Music Video and USL other than worldwide language, but country languages
Music video production language—MVL
User selected language—USL
World Language—WL
Then Music contest will be available on this method.
 Music Video and Subtitles—Options and Priorities
  Music video play/available in MVL, with Lyrics in USL as subtitles
  Music video play/available in MVL, with Lyrics in WL as subtitles
  Music video play/available in MVL, with Meaning in USL as subtitles
  Music video play/available in MVL, with Meaning in WL as subtitles
  Music video play/available in MVL, with Lyrics in MVL as subtitles
  Music video play/available in MVL, with No Subtitles
 Questions—USL For a video in one country language it is not always possible to have the subtitles in user's country language. First priority is not met always. So, second priority is the most used option.

EXAMPLE 1

Music video production language—Hindi
User selected language—Japanese
World Language—WL/English
Then Music contest will be available on this method.
 Music Video and Subtitles—Options and Priorities
  Music video play/available in Hindi, with Lyrics in Japanese as subtitles
  Music video play/available in Hindi, with Lyrics in English as subtitles
  Music video play/available in Hindi, with Meaning in Japanese as subtitles
  Music video play/available in Hindi, with Meaning in English as subtitles
  Music video play/available in Hindi, with Lyrics in Hindi as subtitles
  Music video play/available in Hindi, with No Subtitles
 Questions—Japanese For a video in one country language it is not possible to have the subtitles in user's country language. First priority is not met always. So, second priority is the most used option.

Standard Format 4:

For Music video language is different country language, but not Indian, User selected language is Indian state language.
Music video production language—MVL
User selected language—USL
World Language—WL
Then Music contest will be available on below methods.

Method 1: If user is located in a geographical location within India, where Hindi is dominant, then this method is applicable. Northern India and most of India falls into this category. Primary identification factor is USL. If USL is not in these languages then this method is applicable (Kannada, Telugu, Tamil, and Malayalam).
 Music Video and Subtitles—Options and Priorities
  a. Music video play/available in MVL, with Lyrics in USL as subtitles
  b. Music video play/available in MVL, with Lyrics in CL as subtitles
  c. Music video play/available in MVL, with Lyrics in WL as subtitles
  d. Music video play/available in MVL, with Meaning in USL as subtitles
  e. Music video play/available in MVL, with Meaning in CL as subtitles
  f. Music video play/available in MVL, with Meaning in WL as subtitles
  g. Music video play/available in MVL, with Lyrics in MVL as subtitles
  h. Music video play/available in MVL, with No Subtitles
 Questions—USL

EXAMPLE 1

Music video production language—French
User selected language—Marathi
Country Language—Hindi
World Language—WL/English
Then Music contest will be available on this method.
 Music Video and Subtitles—Options and Priorities
  Music video play/available in French, with Lyrics in Marathi as subtitles
  Music video play/available in French, with Lyrics in Hindi as subtitles
  Music video play/available in French, with Lyrics in English as subtitles
  Music video play/available in French, with Meaning in Marathi as subtitles Music video play/available in French, with Meaning in Hindi as subtitles
Music video play/available in French, with Meaning in English as subtitles
Music video play/available in French, with Lyrics in French as subtitles
Music video play/available in French, with No Subtitles
Questions—Marathi Most used option Both English and Hindi options. As usage of English goes on increasing in India, English will replace Hindi as most used option.

Method 2: If user is located in a geographical location within India, where English is dominant, then this method is applicable. Southern India falls into this category. Primary identification factor is USL. If USL is in these languages then this method is applicable (Kannada, Telugu, Tamil, and Malayalam).

Music Video and Subtitles—Options and Priorities
  a. Music video play/available in MVL, with Lyrics in USL as subtitles
  b. Music video play/available in MVL, with Lyrics in WL as subtitles
  c. Music video play/available in MVL, with Lyrics in CL as subtitles
  d. Music video play/available in MVL, with Meaning in USL as subtitles
  e. Music video play/available in MVL, with Meaning in WL as subtitles
  f. Music video play/available in MVL, with Meaning in CL as subtitles
  g. Music video play/available in MVL, with Lyrics in MVL as subtitles
  h. Music video play/available in MVL, with No Subtitles
Questions—USL Most used option—Second priority is most used option (English Subtitles).

EXAMPLE 1

Music video production language—French
User selected language—Telugu
Country Language—Hindi
World Language—WL/English
Then Music contest will be available on this method.
  Music Video and Subtitles—Options and Priorities
    Music video play/available in French, with Lyrics in Telugu as subtitles
    Music video play/available in French, with Lyrics in English as subtitles
    Music video play/available in French, with Lyrics in Hindi as subtitles
    Music video play/available in French, with Meaning in Telugu as subtitles
    Music video play/available in French, with Meaning in English as subtitles
    Music video play/available in French, with Meaning in Hindi as subtitles
    Music video play/available in French, with Lyrics in French as subtitles
    Music video play/available in French, with No Subtitles
  Questions—Telugu
Note: Most used option—Second priority is most used option (English Subtitles).

Standard Format 5: For Music Video in Indian state language and User selected language is different country language, but not English.
Music video production language—MVL
User selected language—USL
World Language—WL
Then Music contest will be available on this method.
  Music Video and Subtitles—Options and Priorities
    Music video play/available in MVL, with Lyrics in USL as subtitles
    Music video play/available in MVL, with Lyrics in WL as subtitles
    Music video play/available in MVL, with Meaning in USL as subtitles
    Music video play/available in MVL, with Meaning in WL as subtitles
    Music video play/available in MVL, with Lyrics in MVL as subtitles
    Music video play/available in MVL, with No Subtitles
  Questions—USL

EXAMPLE 1

Music video production language—Telugu
User selected language—Japanese
World Language—WL/English
Then Music contest will be available on this method.
  Music Video and Subtitles—Options and Priorities
    Music video play/available in Telugu, with Lyrics in Japanese as subtitles
    Music video play/available in Telugu, with Lyrics in English as subtitles
    Music video play/available in Telugu, with Meaning in Japanese as subtitles
    Music video play/available in Telugu, with Meaning in English as subtitles
    Music video play/available in Telugu, with Lyrics in Telugu as subtitles
    Music video play/available in Telugu, with No Subtitles
  Questions—Japanese
Note: Most used option—Second priority is most used option (English Subtitles).

Standard Format 6: For both Music video language and User selected language is Indian state languages.
Music video production language—MVL
User selected language—USL
World Language—WL
Country Language—CL
Then Music contest will be available on below methods.
Method 1:
If user is located in a geographical location within India, where Hindi is dominant, then this method is applicable. Northern India and most of India falls into this category. Primary identification factor is USL. If USL is not in these languages then this method is applicable (Kannada, Telugu, Tamil, and Malayalam).
  Music Video and Subtitles—Options and Priorities
    Music video play/available in MVL, with Lyrics in USL as subtitles
    Music video play/available in MVL, with Lyrics in CL as subtitles
    Music video play/available in MVL, with Lyrics in WL as subtitles
    Music video play/available in MVL, with Meaning in USL as subtitles
    Music video play/available in MVL, with Meaning in CL as subtitles Music video play/available in MVL, with Meaning in WL as subtitles
Music video play/available in MVL, with Lyrics in MVL as subtitles
Music video play/available in MVL, with No Subtitles
Questions—USL Most used option—Both English (WL) and Hindi (CL) options. As usage of English goes on increasing in India, English will replace Hindi as most used option.

EXAMPLE 1

Music video production language—Kannada
User selected language—Marathi
Country Language—Hindi
World Language—WL/English
Then Music contest will be available on this method.
   Music Video and Subtitles—Options and Priorities
      Music video play/available in Kannada, with Lyrics in Marathi as subtitles
      Music video play/available in Kannada, with Lyrics in Hindi as subtitles
      Music video play/available in Kannada, with Lyrics in English as subtitles
      Music video play/available in Kannada, with Meaning in Marathi as subtitles
      Music video play/available in Kannada, with Meaning in Hindi as subtitles
      Music video play/available in Kannada, with Meaning in English as subtitles
      Music video play/available in Kannada, with Lyrics in Kannada as subtitles
      Music video play/available in Kannada, with No Subtitles
   Questions—Marathi Most used option Both English and Hindi options. As usage of English goes on increasing in India, English will replace Hindi as most used option.
   Method 2:

If user is located in a geographical location within India, where English is dominant, then this method is applicable. Southern India falls into this category. Primary identification factor is USL. If USL is in these languages then this method is applicable (Kannada, Telugu, Tamil, and Malayalam).
   Music Video and Subtitles—Options and Priorities
      Music video play/available in MVL, with Lyrics in USL as subtitles
      Music video play/available in MVL, with Lyrics in WL as subtitles
      Music video play/available in MVL, with Lyrics in CL as subtitles
      Music video play/available in MVL, with Meaning in USL as subtitles
      Music video play/available in MVL, with Meaning in WL as subtitles
      Music video play/available in MVL, with Meaning in CL as subtitles
      Music video play/available in MVL, with Lyrics in MVL as subtitles
      Music video play/available in MVL, with No Subtitles
Questions—USL Most used option—Second priority is most used option (English Subtitles).

EXAMPLE 1

Music video production language—Kannada
User selected language—Telugu
Country Language—Hindi
World Language—WL/English
Then Music contest will be available on this method.
   Music Video and Subtitles—Options and Priorities
      Music video play/available in Kannada, with Lyrics in Telugu as subtitles
      Music video play/available in Kannada, with Lyrics in English as subtitles
      Music video play/available in Kannada, with Lyrics in Hindi as subtitles
      Music video play/available in Kannada, with Meaning in Telugu as subtitles
      Music video play/available in Kannada, with Meaning in English as subtitles
      Music video play/available in Kannada, with Meaning in Hindi as subtitles
      Music video play/available in Kannada, with Lyrics in Kannada as subtitles
      Music video play/available in Kannada, with No Subtitles
   Questions—Telugu Most used option—Second priority is most used option (English Subtitles).
   Standard Format 7:

For music videos in India Country Language (Hindi) and USL is Indian State Languages.
Music video production language—MVL
User selected language—USL
Then Music contest will be available on this method.
   Music Video and Subtitles—Options and Priorities
      Music video play/available in MVL, with Lyrics in USL/WL as subtitles
      Music video play/available in MVL, with Lyrics in MVL as subtitles
      Music video play/available in MVL, with No Subtitles
      Music video play/available in MVL, with Meaning in USL as subtitles
   Questions—USL

EXAMPLE 1

Music video production language Hindi
User selected language Kannada
Then Music contest will be available on this method.
   Music Video and Subtitles—Options and Priorities
      Music video play/available in Hindi, with Lyrics in Kannada/English as subtitles
      Music video play/available in Hindi, with Lyrics in Hindi as subtitles
      Music video play/available in Hindi, with No Subtitles
      Music video play/available in Hindi, with Meaning in Kannada as subtitles
   Questions—Kannada

EXAMPLE 2

Music video production language—Hindi
User selected language—Telugu
Then Music contest will be available on this method.
   Music Video and Subtitles—Options and Priorities
      Music video play/available in Hindi, with Lyrics in Telugu/English as subtitles
      Music video play/available in Hindi, with Lyrics in Hindi as subtitles
      Music video play/available in Hindi, with No Subtitles
      Music video play/available in Hindi, with Meaning in Telugu as subtitles
   Questions—Telugu Standard Format 8: For music videos is in Indian state languages, User selected Language is India Country Language.
Music video production language—MVL
User selected language—USL
USL=WL
Then Music contest will be available on this method.
   Music Video and Subtitles—Options and Priorities
      Music video play/available in MVL, with Lyrics in USL/WL as subtitles
      Music video play/available in MVL, with Lyrics in MVL as subtitles
      Music video play/available in MVL, with No Subtitles
      Music video play/available in MVL, with Meaning in USL as subtitles
   Questions—USL Step 304: Contest Questions—Once the music video is consumed, the Questions related to the contents are fetched and displayed to the users. Questions can be in any format. Fill in the blank questions, multiple choice questions etc.

Questions are based on music video and related to artists/production/actors shown in the music video and related to them. Some sample Questions include
   Who is artist in the music video?
   Who is actor in the music video?
   Who is actress in the music video?
   Which Company/Studio/Production House had produced the music video (if the music video is part of movie, like in typical Hindi movies)?
   Who is the director?
   Select the famous music video of Justin Bieber from the below list. (If Justin Bieber is part of the current music video)
   Fill in the blanks Questions From the music video "Baby—Justin Beiber" complete the words as in music You know you love me, I know . . . .
   If Sony Music has produced current music video, the question could be
From below list select the music video produced by Sony music.

Questions will be available in the language selected by the user. The questions will appear in English, if user had selected English in the languages list. The questions will appear in Hindi if the user selects Hindi in language selection.

Questions and music video need not always be in the same language. For a music video produced in English and user selection language is French, the music video will appear in English or French, but the questions will be in French.

Questions script can be in different Language from user selected language. This will be helpful, if certain language scripts are not compatible or can't be easily written and posted as questions. For example, if user selects Kannada (One of Indian State language) as Language, the questions will be in Kannada, but the script can be in Kannada or English or Hindi.

The Question is who is artist/actor shown in the music video? This one question is presented in Kannada as below in two ways.

Part 1: With Kannada Script
ಈಮ್ಯೂಸಿಕ್‌ಆರ್ಲಿಘ ತುವಹೀರೊ ಃಹೆಸರುಬನು?
(Meaning—who is hero/actor shown in the music video, written in Kannada Language)
a). ಜಾಕಿಚಾನ್ (Means Jackie Chan)
b). ಕ್ರಿಸ್ಟಿಯನ್‌ಬೇಲ್ (Means Christian Bale)
c). ಕ್ರಿಸ್‌ಇವಾನ್ಸ್ (Means Chris Evans)

Part 2: With English script of Kannada
Eemusic video alliiruvaartisthesaruenu?
(Meaning—who is artist/actor shown in the music video. Written in Kannada language, English Script)
a). Tylor Swipt
b). Miley Cyrus
c). Pit Bull In Part 1 Question is presented in Kannada, In Part 2 language is Kannada but script is English. Similarly, the Hindi script can be adopted. Most often English script will be taken as it is the international language, but if some other language is stronger in that particular geography like Japanese, then such a language can be used.

Step 305: Save and Submit Options—Once the user takes the contest, the user is provided with following input options.
   Save button the user can save the contest for future submission.
   Submit button the user can submit the contest.

Step 306: Winners Selection—One or more lucky winners are chosen from the users who had and taken the contest and answered correctly.

Figure 4:
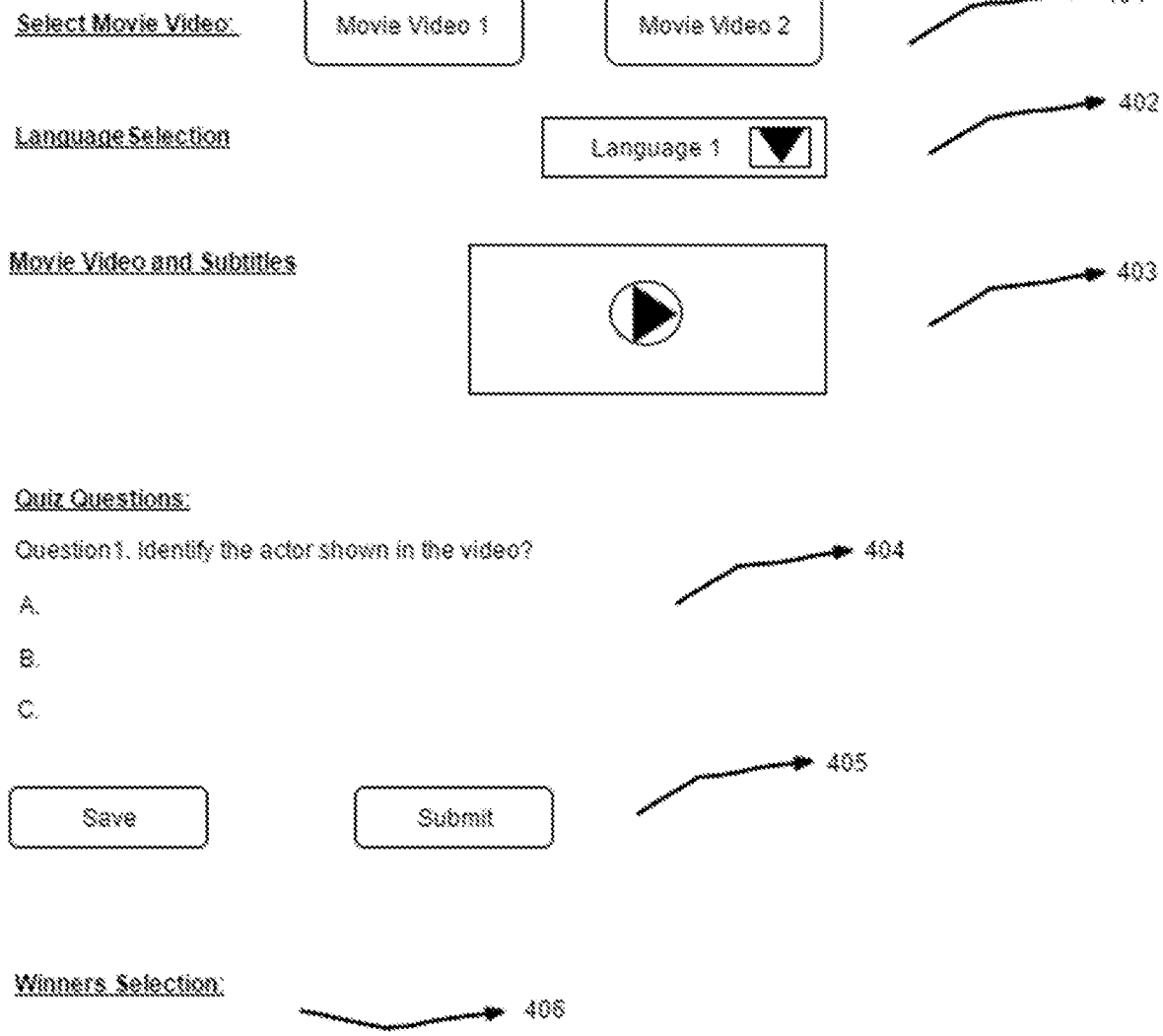
FIG. 4 illustrates an exemplary implementation of an embodiment of the invention, where contents are movie video.

FIG. 4 illustrates an exemplary implementation of an embodiment of the invention, where contents are movie video. The example is shown as an online contest being taken by a user, by consuming contents in a preferred language and further answering the questions to take the contest.

Users visit the website or Mobile Application (App) which implements the invention. User can sign in or create a profile using signup.

Step 401: Movie video Selection—In the website/App one or more contests are available. User selects the Movie, which user wants to take part in quiz contest. For Example, if user wants to take part in "Iron Man Trailer", user selects the same available contests list. Once the user selects the Movie/Movie video, then the user is directed to the next screen/same screen where quiz contest is present.

Step 402: Language Selection—User selects the Language from the available languages for the contest. Languages options are presented in drop down manner or in list manner or in grid manner or in any other manner The languages available for selection indicates that same contest can be taken in different languages. These depend on the intended audience. For Movie video produced in English, if the audience is worldwide then more one language will be available for selection. The languages for selection can be English, Hindi, Spanish, Dutch, and French etc.

One language is set as default out of all the available languages for the contest. This depends on the geography of the user who is taking the contest and language in which Movie video is produced. This is explained as, consider the example below
   a) If the intended audience is India, then English or Hindi becomes the default language.
   b) If the intended audience is China, then Mandarin becomes default language.
   c) If the intended audience is Japan, then Japanese becomes default language.

In most cases, default language is the language of the country in which user is located, if the contest is available in that particular language. If the contest is not available then it will be set to closest language of the user available for selection. If the Movie video produced in English and user is located at English speaking country then English will be default language.

Selection of the Language, Controls the language in which questions will appear/available. Contest Questions appear/available in the user selected language. For example, if user chooses English, the questions will appear/available in English. If user chooses French, the questions will appear/available in French. However the script can be world language like English or country language.

Language Selection controls the language in which Movie video and subtitles play/appear/available. Play/appearance of Movie video is important part. The Movie video and subtitles will appear/play depends on language selected by the user. The playing of Movie video along with subtitles or without subtitles and the language of the subtitles depend on several factors like language in which Movie video is produced and language selected by the user.

Step 403: Playing or Appearance of Movie Video and Subtitles—Play/appearance of Movie video is important part. The Movie video and subtitles will appear/play depends on language selected by the user. The playing of Movie video along with subtitles or without subtitles and the language of the subtitles depends on several factors like language in which Movie video is produced and language selected by the user. Since English is the world language and World is using English more, subtitles scripts tends towards English.

Languages Category:
World languages—English etc
Country Languages—Japanese, Korean etc
Indian State Languages—Kannada, Tamil, Telugu, Marathi etc
If a language is popular in two or more countries such a language can be considered as both country language and worldwide language depending on the context. Most often English is used as international language. But if need arises languages like Spanish, French, Arabic and Hindi etc can be used.

Subtitles Script: Some scripts not compatible and they cannot be easily written and posted. In such cases the world language like English script or nearest to the language is taken. For most cases English script is adopted. Adoption of different script also depends on country of the user and language which is stronger in that particular region. For example, In India both English and Hindi are stronger. For Indian state languages subtitles (which are result of translation from Movie video language), then English or Hindi script can be adopted.

Now consider,
MTL—Movie video Language
USL—User Selected Language
WL—World Language
CL—Country Language
Consider the scenario, where subtitles are translation of MTL:
Movie video in MTL, subtitles as Translation in USL, then subtitles script options are
   c. Subtitles Script can be in USL
   d. Subtitles Script can be in English/WL or CL of the user
Consider, Translation to USL=x (x is the variable, it holds the value Translation to USL)
Subtitles then can be: (a) x
(b) English/WL script of x
(c) CL script of x This explains subtitles script can be different from subtitles languages. These scripts if not in USL, tend towards international (English) and national languages i.e. will be in English (International language), national language or second best language for the user.

EXAMPLE

Movie video in English, subtitles as Translation in Hindi, then subtitles script options are
   e. Subtitles Script can be in Hindi
   f. Subtitles Script can be in English/WL of Hindi USL script of MTL Subtitles: This can be explained as User Selected Language script of Movie video Language subtitles. For example, consider Movie video language as English. User selected language as Kannada (One of Indian state languages). For a dialog in the Movie video "What is happening"
English script—What is happening.
Kannada script of English—'ವಾಟ್‌ಇಸ್ಸಾ ಹ್ಯಾಪನಿಂಗ್
This is not the translation. It is the script written in Kannada.

CL script of VL Subtitles: This can be explained as User Selected Language script of Movie video Language subtitles. For example, consider Movie video language as English. User selected language as Kannada. Country Language is Hindi. For a dialog in the Movie video "What is happening"
English script—People call me Ram, Krishna, Yahve
Kannada script of English—ಪೀಪಲ್ಕಾ ಲ್ಮಿರಾಮ್ ಕೃಷ್ಣ, ಯಹ್ವೆ
Hindi script English— पीपलकॉलमीराम, कृष्णा, यहवे
This is not the translation. It is the script written in Hindi. Adoption of different script also depends on country of the user and language which is stronger in that particular region. For example, In India both English and Hindi are stronger. For Indian state languages subtitles (which are result of translation from Movie video language), then English or Hindi script can be adopted.

WL script of VL Subtitles: This can be explained as User Selected Language script of Movie video Language subtitles. For example, consider Movie video language as Hindi. User selected language as French. World Language is English.
For a dialog in the Movie video "Kya ho rahahai" in Hindi (Means what is happening in Hindi)
Hindi Script— क्याहोरहहै
English script of Hindi Kya ho rahahai.
This is not the translation. It is the script written in English.

Dubbed Language Script: If Movie video is dubbed from one language to another language, then this case arises.

EXAMPLE 1

English film video is dubbed to Japanese,
Subtitles options:
   a) Japanese subtitles
   b) English/WL script of Japanese subtitles
English scripts are adopted everywhere, because they are easy to create and post.

Further various formats as scenarios are explained.
Standard Format 1: Movie video language and User selected language is same.
(MTL=USL)
Movie video production language—MTL
User selected language—USL
MTL=USL
Then Quiz contest will be available on this method.
   Movie video and Subtitles—Options and Priorities
      Movie video available in MTL, with subtitles in MTL or WL/English script of MTL
      Movie video available in MTL, with No subtitles
      Questions—MTL Most used option—b. In order to maintain originality and in cases if the language is user's native language, without subtitles option is used most of the time.

EXAMPLE 1

Movie video language English
User selected language English
MTL=USL
Then Quiz contest will be available on this method.
 Movie video and Subtitles—Options and Priorities
  Movie video available in English, with subtitles in English
  Movie video available in English, with No subtitles
 Questions—English
Most used option—b. In order to maintain originality and in cases if the language is user's native language, without subtitles option is used most of the time. Assumption is made that subtitles is available in English. If subtitles not available in English, then option "a" is not applicable.

EXAMPLE 2

Movie video language—Hindi
User selected language—Hindi
MTL=USL
Then Quiz contest will be available on this method.
 Movie video and Subtitles—Options and Priorities
  Movie video available in Hindi, with subtitles in Hindi or English script of Hindi.
  Movie video available in Hindi, with No subtitles
 Questions—Hindi
Most used option—b. In order to maintain originality and in cases if the language is user's native language, without subtitles option is used most of the time. Assumption is made that subtitles is available in English. If subtitles not available in English, then option "a" is not applicable.

EXAMPLE 3

Movie video language—Japanese
User selected language—Japanese
MTL=USL
Then Quiz contest will be available on this method.
 Movie video and Subtitles—Options and Priorities
  Movie video available in Japanese, with subtitles in Japanese or English script of Hindi.
  Movie video available in Japanese, with No subtitles
 Questions—Japanese
Most used option—b. In order to maintain originality and in cases if the language is user's native language, without subtitles option is used most of the time.
Note: Assumption is made that subtitles is available in English. If subtitles not available in English, then option "a" is not applicable.
 Standard Format 2: Movie video in worldwide language like English, User selected language is not worldwide language, but country language. (WL to CL)
Movie video production language—MTL
User selected language—USL
Then Movie video Contest will be available on this method.
 Movie video and Subtitles—Options and Priorities
USL Dubbed Version
 Movie video in USL dubbed version, with Subtitles in USL or WL/English script of USL.
 Movie video in USL dubbed version, with no Subtitles.
MTL Dubbed Version
 Movie video available in MTL, with Translation in USL as subtitles.
 Movie video available in MTL, with USL script of MTL Subtitles.
 Movie video available in MTL, with Subtitles in MTL.
 Movie video available in MTL, with No Subtitles.
Questions—USL
Assumption is made that subtitles is available in USL and MTL. If subtitles not available in USL, then options a, b are not applicable. If subtitles not available in MTL, then option c is not applicable.

EXAMPLE 1

Movie video production language—English
User selected language—Hindi
Then Movie video Contest will be available on this method.
 Movie video and Subtitles—Options and Priorities
Hindi Dubbed Version
 Movie video in Hindi dubbed version, with subtitles in Hindi or WL/English script of Hindi
 Movie video in Hindi dubbed version, with no subtitles.
English Version
 Movie video available in English, with Translation in Hindi as subtitles.
 Movie video available in English, with Hindi script of English Subtitles.
 Movie video available in English, with Subtitles in English.
 Movie video available in English, with No Subtitles.
Questions—Hindi
Assumption is made that subtitles is available in Hindi and English. If subtitles not available in Hindi, then options a, b are not applicable. If subtitles not available in English, then option c is not applicable.

EXAMPLE 2

Movie video production language—English
User selected language—Japanese
Then Movie video Contest will be available on this method.
 Movie video and Subtitles—Options and Priorities
Japanese Dubbed Version
 Movie video in Japanese dubbed version, with subtitles in Japanese or
 WL/English script of Japanese Movie video in Japanese dubbed version, with no subtitles.
English Version
 Movie video available in English, with Translation in Japanese as subtitles.
 Movie video available in English, with Japanese script of English Subtitles.
 Movie video available in English, with Subtitles in English.
 Movie video available in English, with No Subtitles.
Questions—Japanese
Assumption is made that subtitles is available in Japanese and English. If subtitles not available in Japanese, then options a, b are not applicable. If subtitles not available in English, then option c is not applicable.
 Standard Format 3: Movie video in worldwide language like English, User selected language is Indian State Language. (WL to ISL)
Movie video production language—MTL
User selected language USL=ISL
Country Language—CL
Then Movie video Contest will be available on this method.

Movie video and Subtitles—Options and Priorities
USL Dubbed Version
   Movie video in USL dubbed version, with Subtitles in USL or WL/English script of USL.
   Movie video in USL dubbed version, with no Subtitles.
CL/Hindi Dubbed Version
   Movie video in CL/Hindi dubbed version, with USL translation subtitles
   Movie video in CL/Hindi dubbed version, with USL script of CL/Hindi subtitles
   Movie video in CL/Hindi dubbed version, with English/WL/WL script of CL/Hindi subtitles
MTL Dubbed Version
   Movie video available in MTL, with Translation in USL as subtitles.
   Movie video available in MTL, with USL script of MTL Subtitles.
   Movie video available in MTL, with Subtitles in MTL.
   Movie video available in MTL, with No Subtitles.
   Questions—USL
Assumption is made that subtitles is available in USL and MTL. If subtitles not available in USL, then options a, b are not applicable. If subtitles not available in MTL, then option c is not applicable.

EXAMPLE 1

Movie video production language—English
User selected language—Gujarati
Then Movie video Contest will be available on this method.
   Movie video and Subtitles—Options and Priorities
Gujarati Dubbed Version
   Movie video in Gujarati dubbed version, with subtitles in Hindi or WL/English Script of Hindi
   Movie video in Gujarati dubbed version, with no subtitles.
CL/Hindi Dubbed Version
   Movie video in CL/Hindi dubbed version, with Gujarati translation subtitles
   Movie video in CL/Hindi dubbed version, with Gujarati script of CL/Hindi subtitles
   Movie video in CL/Hindi dubbed version, with English/WL/WL script of CL/Hindi subtitles
English Version
   Movie video available in English, with Translation in Gujarati as subtitles.
   Movie video available in English, with Gujarati script of English Subtitles.
   Movie video available in English, with Subtitles in English.
   Movie video available in English, with No Subtitles.
   Questions—Gujarati
Assumption is made that subtitles is available in Hindi and English. If subtitles not available in Hindi, then options a, b are not applicable. If subtitles not available in English, then option c is not applicable.

EXAMPLE 2

Movie video production language—English
User selected language—Marathi
Then Movie video Contest will be available on this method.
   Movie video and Subtitles—Options and Priorities
Marathi Dubbed Version
   Movie video in Marathi dubbed version, with subtitles in Hindi or WL/English script of Hindi
   Movie video in Marathi dubbed version, with no subtitles.
CL/Hindi Dubbed Version
   Movie video in CL/Hindi dubbed version, with Marathi translation subtitles
   Movie video in CL/Hindi dubbed version, with Marathi script of CL/Hindi subtitles
   Movie video in CL/Hindi dubbed version, with English/WL/WL script of CL/Hindi subtitles
English Version
   Movie video available in English, with Translation in Marathi as subtitles.
   Movie video available in English, with Marathi script of English Subtitles.
   Movie video available in English, with Subtitles in English.
   Movie video available in English, with No Subtitles.
   Questions—Marathi
Assumption is made that subtitles is available in Hindi and English. If subtitles not available in Hindi, then options a, b are not applicable. If subtitles not available in English, then option c is not applicable.

Standard Format 4: For Movie videos in language other than English/World Language but country language, and user selected Language is World Language/English (CL to WL)
Movie video production language—MTL
User selected language—USL
USL=WL
Then contest will be available on this method.
   Movie video and Subtitles—Options and Priorities
USL Dubbed Version
   Movie video in USL dubbed version, with Subtitles USL or WL/English script of USL
MTL Version
   Movie video available in MTL, with Translation in USL as subtitles.
   Movie video available in MTL, with USL script of MTL Subtitles.
   Movie video available in MTL, with Subtitles in MTL.
   Movie video available in MTL, with No Subtitles.
   Questions—USL
Assumption is made that subtitles is available in USL and MTL. If subtitles not available in USL, then options a, b are not applicable. If subtitles not available in MTL, then option c is not applicable.

EXAMPLE 1

Movie video production language Hindi
User selected language English
Then Movie video Contest will be available on this method.
   Movie video and Subtitles—Options and Priorities
English Dubbed Video
   Movie video in English dubbed version, with Subtitles English
Hindi Video
   Movie video available in Hindi, with Translation in English as subtitles.
   Movie video available in Hindi, with English script of Hindi Subtitles.
   Movie video available in Hindi, with Subtitles in Hindi.
   Movie video available in Hindi, with No Subtitles.
   Questions—English
Assumption is made that subtitles is available in English and Hindi. If subtitles not available in English, then options a, b are not applicable. If subtitles not available in Hindi, then option c is not applicable.

Standard Format 5: For Movie videos in Indian State Language, and user selected Language is World Language/English (ISL to WL)
Movie video production language—MTL
User selected language—USL
USL=WL
Then contest will be available on this method.
Movie video and Subtitles—Options and Priorities
USL Dubbed Version
   Movie video in USL dubbed version, with Subtitles in USL or WL/English script of USL
   Movie video in USL dubbed version, with no Subtitles
CL Dubbed Version
   Movie video in CL dubbed version, USL translation subtitles
   Movie video in CL dubbed version, with subtitles in WL/English script of CL subtitles
   Movie video in CL dubbed version, with subtitles in CL or no subtitles
MTL Version
   Movie video available in MTL, with Translation in USL as subtitles.
   Movie video available in MTL, with USL script of MTL Subtitles.
   Movie video available in MTL, with Subtitles in MTL.
   Movie video available in MTL, with No Subtitles.
Questions—USL
Assumption is made that subtitles is available in USL and MTL. If subtitles not available in USL, then options a, b are not applicable. If subtitles not available in MTL, then option c is not applicable.

EXAMPLE 1

Movie video production language—Telugu
User selected language—English
Then Movie video Contest will be available on this method.
Movie video and Subtitles—Options and Priorities
English Dubbed Version Movie video in English dubbed version, with Subtitles in English
   Movie video in English dubbed version, with no Subtitles
Hindi Dubbed Version
   Movie video in Hindi dubbed version, English translation subtitles
   Movie video in Hindi dubbed version, with subtitles in English script of Hindi subtitles
   Movie video in Hindi dubbed version, with subtitles in Hindi or no subtitles
Telugu Video
   Movie video available in Telugu, with Translation in English as subtitles.
   Movie video available in Telugu, with English script of Telugu Subtitles.
   Movie video available in Telugu, with Subtitles in Telugu.
   Movie video available in Telugu, with No Subtitles.
Questions—English
Assumption is made that subtitles is available in English and Hindi. If subtitles not available in English, then options a, b are not applicable. If subtitles not available in Hindi, then option c is not applicable.

Standard Format 6—Both Movie video and User selected language are not worldwide language two but different country languages. (CL to CL)
Movie video production language—MTL
User selected language—USL
World Language—WL
Then contest will be available on this method.
Movie video and Subtitles—Options and Priorities
USL Dubbed Version
   Movie video in USL dubbed version, with USL subtitles
   Movie video in USL dubbed version, with English/WL script of USL Subtitles
WL/English Dubbed Version
   Movie video in English/WL dubbed version, with USL translation as subtitles
   Movie video in English/WL dubbed version, with USL script of English subtitles
   Movie video in English/WL dubbed version, with English subtitles
MTL Version
   Movie video available in MTL, with Translation in USL as subtitles.
   Movie video available in MTL, with Translation in WL as subtitles.
   Movie video available in MTL, with USL script of MTL Subtitles.
   Movie video available in MTL, with WL script of MTL Subtitles.
   Movie video available in MTL, with Subtitles in MTL.
   Movie video available in MTL, with No Subtitles.
Questions—USL
Assumption is made that subtitles is available in USL, WL and MTL. If subtitles not available in USL, then options a, c are not applicable. If subtitles not available in WL, then options b, d not applicable. If subtitles not available in MTL, then option e is not applicable.

EXAMPLE 1

Movie video production language—Hindi
User selected language—Japanese
World Language—WL/English
Then Movie video Contest will be available on this method.
Movie video and Subtitles—Options and Priorities
Japanese Dubbed Version
   Movie video in Japanese dubbed version, with Japanese subtitles
   Movie video in Japanese dubbed version, with English script of Japanese Subtitles
WL/English Dubbed Version
   Movie video in English dubbed version, with Japanese translation as subtitles
   Movie video in English dubbed version, with Japanese script of English subtitles
   Movie video in English dubbed version, with English subtitles
Hindi Dubbed Version
   Movie video available in Hindi, with Translation in Japanese as subtitles.
   Movie video available in Hindi, with Translation in English as subtitles.
   Movie video available in Hindi, with Japanese script of Hindi Subtitles.
   Movie video available in Hindi, with English script of Hindi Subtitles.
   Movie video available in Hindi, with Subtitles in Hindi.
   Movie video available in Hindi, with No Subtitles.
Questions—Japanese
Assumption is made that subtitles is available in Japanese, English and Hindi. If subtitles not available in Japanese, then options a, c are not applicable. If subtitles not available in English, then options b, d not applicable. If subtitles not available in Hindi, then option e is not applicable.

Standard Format 7—Movie video language is Indian State language and User selected language is Country language but not worldwide language/English. (ISL to CL)
Movie video production language—MTL=Indian State Language
User selected language—USL
World Language—WL
Country Language—CL
Then contest will be available on this method.
  Movie video and Subtitles—Options and Priorities
  USL Dubbed Version
    Movie video in USL dubbed version, with USL subtitles
    Movie video in USL dubbed version, WL/English script of USL subtitles
  CL Dubbed Version
    Movie video in CL dubbed version, with USL translation subtitles
    Movie video in CL dubbed version, with USL script of CL subtitles
    Movie video in CL dubbed version, with English/WL script of CL subtitles
  WL/English Dubbed Version
    Movie video in English dubbed version, with USL translation as subtitles
    Movie video in English dubbed version, with USL script of English subtitles
    Movie video in English dubbed version, with English subtitles
  MTL Version
    Movie video available in MTL, with Translation in USL as subtitles.
    Movie video available in MTL, with Translation in English as subtitles.
    Movie video available in MTL, with USL script of MTL Subtitles.
    Movie video available in MTL, with English script of MTL Subtitles.
    Movie video available in MTL, with Subtitles in MTL.
    Movie video available in MTL, with No Subtitles.
  Questions—USL
Assumption is made that subtitles is available in USL, WL and MTL. If subtitles not available in USL, then options a, c are not applicable. If subtitles not available in WL, then options b, d not applicable. If subtitles not available in MTL, then option e is not applicable.

EXAMPLE 1

Movie video production language—Telugu
User selected language—Japanese
World Language—WL/English
Then Movie video Contest will be available on this method.
  Movie video and Subtitles—Options and Priorities
  Japanese Dubbed Version
    Movie video in Japanese dubbed version, with Japanese subtitles
    Movie video in Japanese dubbed version, with English script of Japanese subtitles
  Hindi Dubbed Version
    Movie video in Hindi dubbed version, with Japanese translation subtitles
    Movie video in Hindi dubbed version, with Japanese script of Hindi subtitles
    Movie video in Hindi dubbed version, with English/WL script of Hindi subtitles
  English Dubbed Version
    Movie video in English dubbed version, with Japanese translation as subtitles
    Movie video in English dubbed version, with Japanese script of English subtitles
    Movie video in English dubbed version, with English subtitles
  Telugu Version
    Movie video available in Telugu, with Translation in Japanese as subtitles.
    Movie video available in Telugu, with Translation in English as subtitles.
    Movie video available in Telugu, with Japanese script of Telugu Subtitles.
    Movie video available in Telugu, with English script of Telugu Subtitles.
    Movie video available in Telugu, with Subtitles in Telugu.
    Movie video available in Telugu, with No Subtitles.
  Questions—Japanese
Assumption is made that subtitles is available in Japanese, English and Telugu. If subtitles not available in Japanese, then options a, c are not applicable. If subtitles not available in English, then options b, d not applicable. If subtitles not available in Telugu, then option e is not applicable.

Standard Format 8: Movie video language is not a worldwide language/English but country language and User selected language is Indian state language. (CL to ISL)
Movie video Language—MTL
User selected language—USL=ISL
Indian State Language—ISL
World Language—WL
Country Language—CL (Example: Hindi—Indian Country Language)
Then contest will be available on this method.
  Movie video and Subtitles—Options and Priorities
  USL Dubbed Version
    Movie video in USL dubbed version, with USL subtitles
    Movie video in USL dubbed version, with English/WL script of USL subtitles
  CL/Hindi Dubbed Version
    Movie video in CL/Hindi dubbed version, with USL translation subtitles
    Movie video in CL/Hindi dubbed version, with USL script of CL/Hindi subtitles
    Movie video in CL/Hindi dubbed version, with English/WL/WL script of CL/Hindi subtitles
  English/WL Dubbed Version
    Movie video in English/WL dubbed version, with USL translation as subtitles
    Movie video in English/WL dubbed version, with USL script of English/WL subtitles
    Movie video in English/WL dubbed version, with English/WL subtitles
  MTL Video
    Movie video available in MTL, with Translation in USL as subtitles.
    Movie video available in MTL, with Translation in CL/Hindi as subtitles or Movie video available in MTL, with Translation in English/WL as subtitles *
    Movie video available in MTL, with USL script of MTL Subtitles.
    Movie video available in MTL, with CL/Hindi script of MTL Subtitles or Movie video available in MTL, with English/WL script of MTL Subtitles *
    Movie video available in MTL, with Subtitles in MTL.
    Movie video available in MTL, with No Subtitles.
  Questions—USL India has stronger presence of both WL (English) and CL (Hindi) languages. Strength of English and Hindi in India varies, not same throughout India. Assumption is made that subtitles is available in USL, WL, CL and MTL. If subtitles not available in USL, then options a, c are not applicable. If subtitles not available in CL/WL, then options b, d not applicable. If subtitles not available in MTL, then option e is not applicable.

EXAMPLE 1

Movie video Language—Japanese
User selected language—Telugu
World Language—English
Country Language—Hindi
Then contest will be available on this method.
  Movie video and Subtitles—Options and Priorities
Telugu Dubbed Version
  Movie video in Telugu dubbed version, with Telugu subtitles
  Movie video in Telugu dubbed version, with English script of Telugu subtitles
Hindi Dubbed Version
  Movie video in Hindi dubbed version, with Telugu translation subtitles
  Movie video in Hindi dubbed version, with Telugu script of Hindi subtitles
  Movie video in Hindi dubbed version, with English/WL script of Hindi subtitles
English Dubbed Version
  Movie video in English dubbed version, with Telugu translation as subtitles
  Movie video in English dubbed version, with Telugu script of English subtitles
  Movie video in English dubbed version, with English subtitles
Japanese Video
  Movie video available in Japanese, with Translation in Telugu as subtitles.
  Movie video available in Japanese, with Translation in Hindi as subtitles or Movie video available in Japanese, with Translation in English as subtitles *
  Movie video available in Japanese, with Telugu script of Japanese Subtitles.
  Movie video available in Japanese, with Hindi script of Japanese Subtitles or Movie video available in Japanese, with English script of Japanese Subtitles *
  Movie video available in Japanese, with Subtitles in Japanese.
  Movie video available in Japanese, with No Subtitles.
  Questions—Telugu
India has stronger presence of both WL (English) and CL (Hindi) languages. Strength of English and Hindi in India varies, not same throughout India. Assumption is made that subtitles is available in Marathi, English, Hindi and Japanese. If subtitles not available in Marathi, then options a, c are not applicable. If subtitles not available in Hindi, then options b, d not applicable. If subtitles not available in Japanese, then option e is not applicable.
  Standard Format 9: Movie video production language is one of Indian state/domicile language and user selected language is other State/domicile language, consideration is India country. (ISL to ISL)
Movie video Language—MTL
User selected language—USL
World Language—WL
Country Language—CL (Example: Hindi—Indian Country Language)
Then contest will be available on this method.
  Movie video and Subtitles—Options and Priorities
USL Dubbed Version
  Movie video in USL dubbed version, with USL subtitles
  Movie video in USL dubbed version, with WL script of USL subtitles
CL DUBBED VERSION
  Movie video in CL dubbed version, with USL translation subtitles
  Movie video in CL dubbed version, with USL script of CL subtitles
  Movie video in CL dubbed version, with WL/WL script of CL subtitles
WL Dubbed Version
  Movie video in WL dubbed version, with USL translation as subtitles
  Movie video in WL dubbed version, with USL script of WL subtitles
  Movie video in WL dubbed version, with WL subtitles
MTL Video
  Movie video available in MTL, with Translation in USL as subtitles.
  Movie video available in MTL, with Translation in CL as subtitles or Movie video available in MTL, with Translation in WL as subtitles *
  Movie video available in MTL, with USL script of MTL Subtitles.
  Movie video available in MTL, with CL script of MTL Subtitles or Movie video available in MTL, with WL script of MTL Subtitles *
  Movie video available in MTL, with Subtitles in MTL.
  Movie video available in MTL, with No Subtitles.
  Questions—USL
India has stronger presence of both WL (English) and CL (Hindi) languages. Strength of English and Hindi in India varies, not same throughout India. Assumption is made that subtitles is available in USL, WL, CL and MTL. If subtitles not available in USL, then options a, c are not applicable. If subtitles not available in CL/WL, then options b, d not applicable. If subtitles not available in MTL, then option e is not applicable.

EXAMPLE 1

Movie video Language—Kannada
User selected language—Telugu
World Language—English
Country Language—Hindi
Then contest will be available on this method.
  Movie video and Subtitles—Options and Priorities
Telugu Dubbed Version
  Movie video in Telugu dubbed version, with Telugu subtitles
  Movie video in Telugu dubbed version, with English script of Telugu subtitles
Hindi Dubbed Version
  Movie video in Hindi dubbed version, with Telugu translation subtitles
  Movie video in Hindi dubbed version, with Telugu script of Hindi subtitles
  Movie video in Hindi dubbed version, with English/WL script of Hindi subtitles
English Dubbed Version
  Movie video in English dubbed version, with Telugu translation as subtitles Movie video in English dubbed version, with Telugu script of English subtitles Movie video in English dubbed version, with English subtitles Kannada Video Movie video available in Kannada, with Translation in Telugu as subtitles.

Movie video available in Kannada, with Translation in Hindi as subtitles or Movie video available in Kannada, with Translation in English as subtitles *

Movie video available in Kannada, with Telugu script of Kannada Subtitles.

Movie video available in Kannada, with Hindi script of Kannada Subtitles or Movie video available in Kannada, with English script of Kannada Subtitles *

Movie video available in Kannada, with Subtitles in Kannada.

Movie video available in Kannada, with No Subtitles.

Questions—Telugu

India has stronger presence of both WL (English) and CL (Hindi) languages. Strength of English and Hindi in India varies, not same throughout India. Assumption is made that subtitles is available in Marathi, English, Hindi and Kannada. If subtitles not available in Marathi, then options a, c are not applicable. If subtitles not available in Hindi, then options b, d not applicable. If subtitles not available in Kannada, then option e is not applicable.

Indian Languages as USL: This is applicable to Indian state languages (USL—User Selected Language) except where MTL is English. Since in India, English is stronger is some regions (as a second language to native language) and Hindi is stronger in most of India (native language and as a second language to native language). In case of regions in India where native languages are Tamil, Telugu, and Malayalam, the second language, stronger after native language is English. If USL is one of these languages, then English has higher priority.

In northern part of India and most of the country, Hindi is stronger. Hindi takes priority over English. In some regions both English and Hindi are strong. It is not possible to quantify strength of Hindi or English in India. So, one of them is used as a medium if USL is Indian state language.

Step 404: Contest Questions—Once the movie video is consumed, questions related to contents are displayed to the user for taking the contest. Questions can be in any format. Fill in the blank questions, multiple choice questions etc.

Questions are based on Movie video and related to artists/production/actors shown in the Movie video and related to them. Some sample Questions include Who is artist in the Movie video?

Who is actor in the Movie video?

Who is actress in the Movie video?

Which Company/Studio/Production House had produced the Movie video?

Who is the director?

Fill in the blanks Questions

From the Movie video, complete the words. (From the movie x-men apocalypse) Some people call me Ram, Krishna . . . .

If Sony has produced current Movie video, the question could be

From below list select the Movie video produced by Sony.

Questions will be available in the language selected by the user. The questions will appear in English, if user had selected English in the languages list. The questions will appear in Kannada if the user selects Kannada in language selection.

Questions and Movie video need not always be in the same language. For a Movie video produced in English and user selection language is French, the Movie video will appear in English or French, but the questions will be in French.

Questions script can be in different Language from user selected language. This will be helpful, if certain language scripts are not compatible or can't be easily written and posted as questions. For example, if user selects Kannada (One of Indian State language) as Language, the questions will be in Kannada, but the script can be in Kannada or English.

The Question is who is artist/actor shown in the Movie video? This one question is presented in Kannada as below in two ways.

Part 1: With Kannada Script

ಈಮೂವಿಟ್ಚಲರ್ ಅಲ್ಲಿಇರುವಹೀ :ರೋಹೆಸರುಬನು?

(Meaning—who is hero/actor shown in the Movie video written in Kannada Language)

a). ಜಾಕಿಚಾನ್ (Means Jackie Chan)

b). ಕ್ರಿಸ್ಟಿಯನ್ಬೇಲ್ (Means Christian Bale)

c). ಕ್ರಿಸ್ಇವಾನ್ಸ್ (Means Chris Evans)

Part 2: With English script of Kannada

EeMovie video alliiruvaherohesaruenu?

(Meaning—who is artist/actor shown in the Movie video. Written in Kannada language, English Script)

a). Jackie Chan b). Christian Bale c). Chris Evans

In Part 1 Question is presented in Kannada and in Part 2 language is Kannada but script is English. Similarly, the Hindi script can be adopted. Most often English script will be taken as it is the international language, but if some other language is stronger in that particular geography then such a language can be used.

Step 405: Save and Submit Options—Once the user takes the contest, the user is provided with following two input options.

Save button the user can save the contest for future submission.

Submit button the user can submit the contest.

Step 406: Winners Selection—One or more lucky winners are chosen who had taken the quiz contest.

The invention can be implemented as a web application, mobile application, desktop application, or a plugin so as to function with another computing application.

The invention claimed is:

1. A method for enabling an user to consume a video or audio content understandable with respect to a preferred language, the method comprising:

receiving a content selection input from an user for selecting a video or audio content for viewing from a set of contents, wherein the content is available in one or more languages, receiving a location related information of the user, identifying the preferred language for providing the content, fetching the content from the server based on the preferred language, if the content is not available in the preferred language, fetching a text content along with the video or audio content in relation to the preferred language, rendering the video or audio content alone or in synchronization with the text content identifying if a set of questionnaires based on the audio or video content is available in preferred language, then fetching the questionnaire in the preferred language, if the questionnaire is not available in the preferred language, then either;
  processing the location related information and language availability information for the questionnaire as translation or iteration script in the preferred language, fetching language influence index for each of the language, comparing language influence index, and fetching the questionnaire as translation or iteration scrip in the language with highest influence index,
  rendering the questionnaire or;
  translating the questionnaire in the preferred language, fetching the translated questionnaire
  rendering the questionnaire.

2. The method according to the claim 1, wherein identifying the preferred language for providing the content based on the location related information or the selection input, or combination thereof.

3. The method according the claim 1, wherein the preferred language is provided as an input by the user, and if the content is not available in the preferred language then processing the location related information and language availability information for the audio or video content in which the contents are available, fetching language influence index for each of the language, comparing language influence index, and fetching the audio or video content in the language with highest influence index.

4. The method according to the claim 3, comprising:
  identifying if the text content is available as translation in the preferred language, and fetching the text content as translation in the preferred language from the server.

5. The method according to the claim 4, wherein if the text content is not available as the translation in the preferred language, identifying if the text content is available as iteration in script of the preferred language, and fetching the text content as iteration in the script of the preferred language from the server.

6. The method according to claim 5, wherein if the text content is not available as iteration in the script of the preferred language, then processing the location related information and language availability information for the text content as translation or iteration script of the audio or video content, fetching language influence index for each of the language, comparing language influence index, and fetching the text content as translation or iteration scrip in the language with highest influence index.

7. A method for enabling an user to consume a music video understandable with respect to a preferred language, the method comprising:
  receiving a content selection input from an user for selecting the music video for viewing from a set of contents, wherein the music video is available in one languages,
  receiving a location related information of the user,
  identifying the preferred language for providing the content,
  if the preferred language is not the language of the music video, fetching a text content along with the video or audio content based on the preferred language,
  fetching the content from the server in relation to the preferred language,
  rendering the video or audio content alone or in synchronization with the text content
  identifying if a set of questionnaires based on the audio or video content is available in preferred language, then fetching the questionnaire in the preferred language,
  if the questionnaire is not available in the preferred language, then either;
    processing the location related information and language availability information for the questionnaire as translation or iteration script in the preferred language, fetching language influence index for each of the language, comparing language influence index, and fetching the questionnaire as translation or iteration scripT in the language with highest influence index,
    rendering the questionnaire or
    translating the questionnaire in the preferred language, fetching the translated questionnaire
    rendering the questionnaire.

8. The method according to claim 7 comprising:
  identifying if the text content is available as iteration in script of the preferred language, and fetching the text content as iteration in script of the preferred language from the server.

9. The method according to the claim 8, wherein if the text content is not available as iteration in script of the preferred language, identifying if the text content is available as translation in the preferred language, and fetching the text content as translation in the preferred language from the server.

10. The method according to claim 9, wherein if the text content is not available as iteration in the script of the preferred language, then processing the location related information and language availability information for the text content as translation or iteration script of the music video, fetching language influence index for each of the language, comparing language influence index, and fetching the text content as translation or iteration script in the language with highest influence index.

11. A system for enabling an user to consume a video or audio content understandable with respect to a preferred language, the system comprising:
  One or memory devices storing at least one of contents, language availability of contents, language influential index of each of the language with respect to a geographic location, or a location information of a user,
  Input devices adapted to receive a content selection input from the user for selecting a video or audio content for viewing from a set of contents, wherein the content is available in one or more languages,
  One or more processors adapted to:
    Provide one or more selection of contents,
    receiving the content selection input from the input device,
    receiving a location related information of the user,
    identifying the preferred language for providing the content,
    fetching the content from the server based on the preferred language,
    if the content is not available in the preferred language, fetching a text content along with the video or audio content in relation to the preferred language,
  a display device adapted to show the selection and further receiving the audio or video content alone or along with the text content and to render the audio or video content alone or along with the text content in synchronization with each other
  wherein the memory stores a set of questionnaire based on audio or video content, the processor is adapted to identifying if the set of questionnaire is available in preferred language, then to fetch the questionnaire in the preferred language based on availability, and if the questionnaire is not available in the preferred language, then either to receive the location related information and a language availability information for the questionnaire as translation or iteration script in the preferred language, to process the location related information and the language availability information, and to fetch a language influence index for each of the language, to compare language influence index, and to fetch the questionnaire as translation or iteration script in the language with highest influence index, or to translate the questionnaire in the preferred language, and to fetch the translated questionnaire, and the display device is adapted to receive the questionnaire from the processor and to render the questionnaire.

12. The system according to the claim 11, wherein identifying the preferred language for providing the content based on the location related information or the selection input, or combination thereof.

13. The system according to the claim 11, wherein the memory stores a location related information, a language availability information regarding availability of the audio or video content in a language, and a language influence index related to influence of a language to a geographic location, and the preferred language is provided as an input by the user via the input device, and if the content is not available in the preferred language then processor is adapted to receive and process the location related information and the language availability information, to fetch language influence index for each of the language, to compare language influence index, and to fetch the audio or video content in the language with highest influence index.

14. The system according to the claim 13, wherein the processor is adapted to identifying if the text content is available as translation in the preferred language or script of the preferred language, and to fetch the text content as translation in the preferred language or script in the preferred language from the server.

15. The system according to claim 14, wherein the memory stores a language availability information for the text content as translation or iteration script of the audio or video content, and if the text content is not available as iteration in the script of the preferred language or translation in the preferred language, then the processor is adapted to receive and process the location related information and the language availability information for the text content as translation or iteration script of the audio or video content, to fetch the language influence index for each of the language, to compare language influence index, and to fetch the text content as translation or iteration script in the language with highest influence index.

* * * * *